United States Patent
Liu et al.

(10) Patent No.: US 11,949,588 B2
(45) Date of Patent: Apr. 2, 2024

(54) LARGE-SCALE REAL-TIME MULTIMEDIA COMMUNICATIONS

(71) Applicant: Agora Lab, Inc., Santa Clara, CA (US)

(72) Inventors: Yong Liu, Shanghai (CN); Yurun Sun, Shanghai (CN); Bin Zhao, Guangdong (CN)

(73) Assignee: Agora Lab, Inc., Santa Clara, CA (US)

(*) Notice: Subject to any disclaimer, the term of this patent is extended or adjusted under 35 U.S.C. 154(b) by 0 days.

(21) Appl. No.: 17/203,962

(22) Filed: Mar. 17, 2021

(65) Prior Publication Data
US 2021/0203594 A1 Jul. 1, 2021

Related U.S. Application Data

(62) Division of application No. 16/110,792, filed on Aug. 23, 2018, now Pat. No. 10,986,017.

(51) Int. Cl.
| | |
|---|---|
| *H04L 12/725* | (2013.01) |
| *H04L 12/26* | (2006.01) |
| *H04L 12/721* | (2013.01) |
| *H04L 43/0852* | (2022.01) |
| *H04L 43/0882* | (2022.01) |

(Continued)

(52) U.S. Cl.
CPC ...... *H04L 45/3065* (2013.01); *H04L 43/0858* (2013.01); *H04L 43/0882* (2013.01); *H04L 45/70* (2013.01)

(58) Field of Classification Search
CPC . H04L 45/3065; H04L 45/70; H04L 43/0882; H04L 43/0858; H04L 43/0852; H04L 43/062; H04L 45/121; H04L 45/42
See application file for complete search history.

(56) References Cited

U.S. PATENT DOCUMENTS

| | | |
|---|---|---|
| 9,338,096 B2 | 5/2016 | Xu et al. |
| 9,450,817 B1* | 9/2016 | Bahadur ............. H04L 41/0806 |
| 9,571,384 B2* | 2/2017 | Wu ........................ H04L 45/64 |

(Continued)

FOREIGN PATENT DOCUMENTS

WO 2017215401 A1 12/2017

OTHER PUBLICATIONS

OpenQoS: An OpenFlow Controller Design for Multimedia Delivery with End-to-End Quality of Service over Software-Defined Networks; Hilmi E. Egilmez, S. Tahsin Dane, K. Tolga Bagci and A. Murat Tekalp.

(Continued)

*Primary Examiner* — Hoang-Chuong Q Vu
(74) *Attorney, Agent, or Firm* — Young Basile Hanlon & MacFarlane, P.C.

(57) ABSTRACT

A method, an apparatus for real-time multimedia communications using a software-defined network (SDN) are provided. The method includes receiving, in a periodic manner, a path metric associated with a first service node in the SDN and a second service node in the SDN, wherein the path metric comprises at least one of: a load status of at least one of the first service node or the second service node, or a transmission metric between the first service node and the second service node; and in response to receiving the path metric, updating a cascade network topology comprising an optimal path for transmitting multimedia data between a first edge node and a second edge node.

20 Claims, 7 Drawing Sheets

(51) Int. Cl.
*H04L 45/00* (2022.01)
*H04L 45/302* (2022.01)

(56) References Cited

U.S. PATENT DOCUMENTS

| | | | |
|---|---|---|---|
| 9,960,956 B1* | 5/2018 | Johnson | H04L 43/20 |
| 10,298,488 B1* | 5/2019 | Wood | H04L 45/22 |
| 10,320,655 B1* | 6/2019 | Asveren | H04L 45/306 |
| 10,419,287 B2* | 9/2019 | Miller | H04L 45/586 |
| 10,574,534 B2* | 2/2020 | Brandwine | H04L 45/02 |
| 2006/0067298 A1* | 3/2006 | Houck | H04L 45/50 |
| | | | 370/252 |
| 2007/0263628 A1 | 11/2007 | Axelsson et al. | |
| 2008/0159288 A1 | 7/2008 | Nagarajan et al. | |
| 2013/0088997 A1 | 4/2013 | Briscoe et al. | |
| 2013/0229975 A1 | 9/2013 | Zainaldin | |
| 2013/0301642 A1 | 11/2013 | Radhakrishnan et al. | |
| 2014/0016635 A1 | 1/2014 | Kano | |
| 2014/0192645 A1 | 7/2014 | Zhang et al. | |
| 2014/0226579 A1 | 8/2014 | Roy | |
| 2015/0043589 A1* | 2/2015 | Han | H04L 69/22 |
| | | | 370/392 |
| 2015/0163152 A1 | 6/2015 | Li | |
| 2015/0180771 A1 | 6/2015 | Ashwood-Smith | |
| 2016/0127246 A1 | 5/2016 | Ashwood-Smith et al. | |
| 2016/0164787 A1 | 6/2016 | Roach et al. | |
| 2016/0212636 A1* | 7/2016 | Dimou | H04W 24/02 |
| 2016/0254984 A1 | 9/2016 | Tekalp et al. | |
| 2016/0277282 A1* | 9/2016 | Chen | H04L 45/122 |
| 2016/0337188 A1* | 11/2016 | Yang | H04L 45/64 |
| 2016/0345054 A1* | 11/2016 | Dhaipule | H04L 65/80 |
| 2016/0350683 A1* | 12/2016 | Bester | G06Q 10/0633 |
| 2017/0070407 A1 | 3/2017 | Lingafelt | |
| 2017/0070423 A1* | 3/2017 | Lingafelt | H04L 45/38 |
| 2017/0093705 A1 | 3/2017 | Gopalan et al. | |
| 2017/0111230 A1* | 4/2017 | Srinivasan | H04L 41/342 |
| 2017/0163443 A1* | 6/2017 | Chen | H04L 45/124 |
| 2017/0289020 A1 | 10/2017 | Zhao | |
| 2017/0317780 A1* | 11/2017 | Wood | H04J 14/0267 |
| 2017/0317933 A1 | 11/2017 | Oran et al. | |
| 2017/0324622 A1* | 11/2017 | Ubaldi | H04L 43/12 |
| 2017/0353382 A1* | 12/2017 | Gupta | H04L 47/10 |
| 2018/0006928 A1 | 1/2018 | Luo et al. | |
| 2018/0006931 A1* | 1/2018 | Ellis | H04L 45/24 |
| 2018/0041430 A1* | 2/2018 | Amante | H04L 45/50 |
| 2018/0041435 A1 | 2/2018 | Zhang | |
| 2018/0307522 A1* | 10/2018 | Wu | H04L 41/0895 |
| 2018/0309664 A1* | 10/2018 | Balasubramanian | H04L 45/74 |
| 2018/0351652 A1* | 12/2018 | Ashrafi | H04B 10/616 |
| 2018/0351813 A1* | 12/2018 | Brandwine | H04L 45/586 |
| 2018/0359181 A1 | 12/2018 | Rumyankov et al. | |
| 2018/0375718 A1* | 12/2018 | Anand | H04L 41/082 |
| 2019/0036779 A1* | 1/2019 | Bajaj | H04L 41/0816 |
| 2019/0036814 A1* | 1/2019 | Aranha | H04L 45/64 |
| 2019/0045401 A1* | 2/2019 | Zhang | H04W 24/02 |
| 2019/0058615 A1* | 2/2019 | Rokui | H04L 41/5054 |
| 2019/0069187 A1* | 2/2019 | Ashrafi | H04W 24/02 |
| 2019/0140947 A1 | 5/2019 | Zhuang et al. | |
| 2019/0182166 A1 | 6/2019 | Ghazisaeedi et al. | |
| 2019/0349287 A1* | 11/2019 | Chandra Sekar Rao | |
| | | | H04L 47/125 |
| 2020/0092184 A1* | 3/2020 | Park | H04L 43/55 |
| 2020/0099546 A1 | 3/2020 | Haag et al. | |
| 2020/0162367 A1* | 5/2020 | Jiang | H04L 45/74 |
| 2021/0076234 A1* | 3/2021 | Ashrafi | H04W 76/10 |

OTHER PUBLICATIONS

Partial Search Report from EP 18199008 dated Mar. 6, 2019.
European Search Report for European Application No. 18199008 dated Jun. 4, 2019.

* cited by examiner

LARGE-SCALE REAL-TIME MULTIMEDIA COMMUNICATIONS

This application is a divisional of U.S. patent application Ser. No. 16/110,792 filed Aug. 23, 2018, which is incorporated herein by reference in its entirety.

TECHNICAL FIELD

Background

Real-time multimedia (e.g., audio or video) communications have wide applications, such as conferences, live broadcasting, or webinars. Multimedia streams can be generated using an end-user terminal equipped with audio/video (A/V) devices (e.g., a microphone and/or a camera) and compressed as bitstreams. The bitstreams can be packetized and transmitted as data packets over a network, such as the Internet, to target users. Once the data packets are received at an end-user terminal, the multimedia bitstream can be decompressed, rendered, and presented (e.g., using a speaker or a display) to a target user.

For multiple-user communications events, multiple end-user terminals can be used to send and receive multimedia streams simultaneously for interactive communications. As the scale of the users increases, expectations of quality and capability of the network and system for supporting such large-scale multimedia communications also become higher.

SUMMARY

Disclosed herein are implementations of methods, apparatuses, and systems for real-time video communications.

In one aspect, a method for real-time multimedia communications using a software-defined network (SDN) is disclosed. The method includes receiving, by a processor, a path metric indicative of transmission capacity between directly-connected service nodes in the SDN, determining, by the processor based on the path metric, a cascade network topology comprising an optimal path between a first edge node and a second edge node, wherein the optimal path has the lowest transmission latency among data transmission paths in the SDN between the first edge node and the second edge node, and based on a determination that multimedia data is to be transmitted between the first edge node and the second edge node, transmitting the multimedia data between the first edge node and the second edge node in accordance with the optimal path.

In another aspect, a system for real-time multimedia communications using an SDN is disclosed. The system includes a first service node in the SDN, a second service node in the SDN, directly connected to the first service node, and a control node in the SDN. The control node includes a processor and a memory coupled to the processor. The memory is configured to store instructions which when executed by the processor become operational with the processor to receive a path metric indicative of transmission capacity between the first service node and the second service node, determine, based on the path metric, a cascade network topology comprising optimal paths from a sender edge node to multiple receiver edge nodes, wherein an optimal path between the sender edge node and an edge node of the multiple receiver edge nodes has the lowest transmission latency in the SDN among data transmission paths between the sender edge node and the edge node, and based on a determination that multimedia data is to be transmitted from the sender edge node to the edge node, transmit the multimedia data from the sender edge node to the edge node in accordance with the optimal path.

In another aspect, an apparatus of an SDN for real-time multimedia communications is disclosed. The apparatus includes a processor and a memory coupled to the processor. The memory is configured to store instructions which when executed by the processor become operational with the processor to receive, in a periodic manner, a path metric associated with a first service node in the SDN and a second service node in the SDN, wherein the path metric comprises at least one of: a load status of at least one of the first service node and the second service node, and a transmission metric between the first service node and the second service node, and in response to receiving the path metric, update a cascade network topology comprising an optimal path for transmitting multimedia data between a first edge node and a second edge node.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
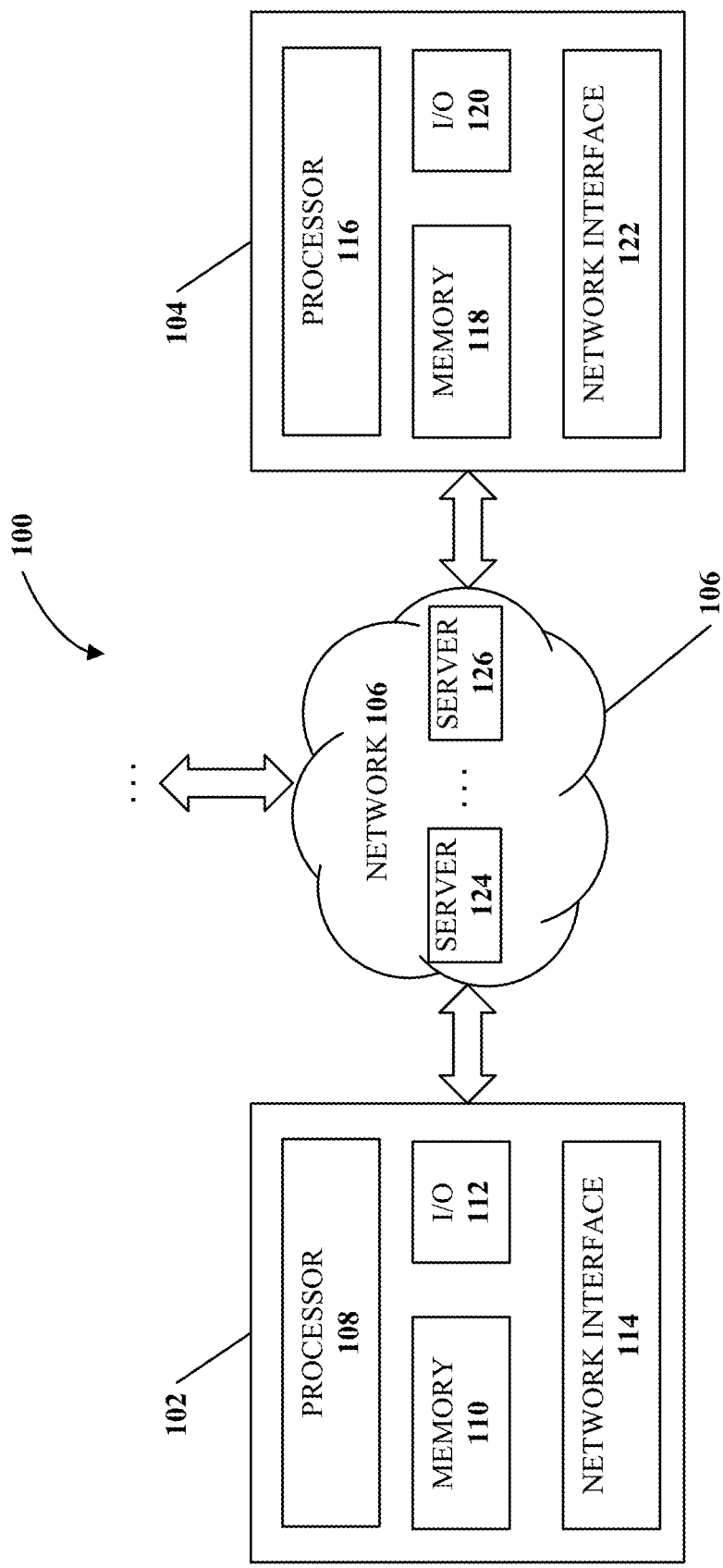
FIG. 1 is a diagram of an example system for real-time video communications according to implementations of this disclosure.

Large-scale real-time multimedia communications over a network can be challenging. In a large-scale real-time multimedia communications event, the number of participating users can be very large (e.g., above 100,000). The users can also be geographically distributed worldwide. When the multimedia communications are interactive, such as in big concerts, online lectures, or live comedy shows, the need for low-latency multimedia transmission can be very demanding (e.g., the latency is expected to be below 400 milliseconds).

For example, in a massive online-education lecture held over several cities, an audience member may expect to participate in a question-answer dialog with a panel of presenters, while all other audience members may expect to hear and jump in the discussion. In a live-broadcasting comedy show held on the Internet for paid watchers, a comedian may expect to control the time to deliver punchlines to all audience members at the same time, react to the laughter instantly, and interact impromptu with an audience member when circumstances fit. In a plenary annual conference held in a multi-national corporation, participants from different countries having different network conditions may expect to have real-life experience of speaking, watching, and listening during the conference to interact with other participants. All those and other similar application scenarios expect low-latency interactive multimedia communications.

Various challenges can exist when providing technical solutions for real-time interactive multimedia communications. For example, a conference mode can be provided for the multimedia communications. The conference mode can allow participants to interact bidirectionally in a low latency, but the maximum allowable number of simultaneous participants can be limited to a small scale, making it unsuitable for large events. For another example, a broadcasting mode can be provided for the multimedia communications. The broadcasting mode can allow a large number of simultaneous participants, but it typically supports only unidirectional communications and has a high latency.

To provide a technical solution for large-scale, low-latency, interactive multimedia communications, systems, apparatuses, and methods using a software-defined network (SDN) are disclosed herein. The SDN is implemented at an application layer of a network and thus can overlay on top of existing public network (e.g., the Internet) infrastructure. The SDN can be implemented as software modules installed in interconnected general-purpose computers (e.g., server computers). The SDN can be built on two categories of computers (referred to as "nodes" hereinafter): service nodes and control nodes. The service nodes and the control nodes are interconnected with each other. The service nodes are used for receiving multimedia data from data-sending user devices, routing (or forwarding) the multimedia data, and delivering the multimedia data to target user devices. The control nodes are used to control data transmission in the SDN, such as determining optimal transmission paths for the data transmission. According to implementations of this disclosure, the control nodes of the SDN can provide a distributive control service. That is, the control service is not centralized (e.g., implemented by a single node or a single node group). Multiple control nodes can be distributed multiple geographical locations of the world to provide the control service of the SDN, and the number, location, configuration of any control node can be modified, changed, added, or removed in any manner at any time during the providing of the control service.

In the SDN, parameters indicative of transmission capacities can be periodically determined between the service nodes. The parameters can be transmitted to the control nodes, based on which the optimal transmission paths can be dynamically determined. When data transmission occurs, depending on the actual network traffic demands, the control nodes can dynamically configure a cascade network topology for transmitting the multimedia data. Also, the SDN can support multi-channel communications, in which multiple events can be simultaneously held using the SDN, and users in different events can be grouped into respective channels for communications, which can suffer no interference therebetween.

The SDN nodes can be deployed anywhere for connecting to the Internet. In some implementations, the SDN nodes can be deployed globally to support planet-scale real-time multimedia communications. Data packets can be routed between the service nodes using SDN connections, non-SDN connections (e.g., direct Internet connections between the service nodes), or a combination thereof. The data packet transmission can be bi-directional between the service nodes.

In some implementations, the SDN can be implemented as software modules only. That is, no dedicated or specialized hardware is needed for building the SDN, and no dedicated or specialized network or network service provider is needed for connecting the SDN. For example, the software modules can be one or more software development kits (SDKs). The SDN can be built and deployed in an application layer of any publicly accessible network (e.g., the Internet). In this way, the SDN can be built with simple hardware requirement, convenient configurations, short time, and low expense. According to implementations of this disclosure, the SDN can support users up to hundreds of thousands for interactive real-time multimedia communications, and the latency thereof can be maintained down to hundreds of milliseconds (ms). Typically, the latency can be between 400-800 ms.

In some implementations SDN can be implemented as software and hardware modules. For example, some of the software modules can be implemented as specific hardware modules, such as, for example, intellectual property (IP) cores, application-specific integrated circuits (ASICs), field-programmable gate arrays (FPGAs), programmable logic arrays, optical processors, programmable logic controllers, microcode, microcontrollers, servers, microprocessors, digital signal processors, or any other suitable circuit. The software modules of the SDN can be built and deployed in an application layer of any publicly accessible network (e.g., the Internet). The hardware modules of the SDN can be interfaced with the software modules to facilitate functions of the software module. In this way, hot spots of the SDN applications can be accelerated by hardware modules, which can boost performance of the SDN system.

FIG. 1 is a diagram of an example system 100 for real-time video communications according to implementations of this disclosure. As shown in FIG. 1, the system 100 can include multiple apparatuses and networks, such as an apparatus 102, an apparatus 104, and a network 106. The apparatuses 102 and 104 can be implemented by any number of any configuration of computers, such as a microcomputer, a mainframe computer, a supercomputer, a general-purpose computer, an integrated computer, a database computer, a remote server computer, a personal computer, a laptop computer, a tablet computer, a cell phone, a personal data assistant (PDA), a wearable computing device, or a computing device provided by a computing service provider (e.g., a web host or a cloud service provider). In some implementations, the apparatuses 102 and 104 can be implemented in the form of multiple groups of computers that are at different geographic locations and can communicate with one another (e.g., via a network). While certain operations can be shared by multiple computers, in some implementations, different computers can be assigned to different operations. In some implementations, the system 100 can be implemented using general-purpose computers with a computer program that, when executed, carries out the methods, algorithms, processes, and/or instructions described herein.

The apparatus 102 can have a hardware configuration including a processor 108, a memory 110, an input/output (I/O) device 112, and a network interface 114. The processor 108 can be any type of device capable of manipulating or processing information. In some implementations, the processor 108 can include a central processor (e.g., a central processing unit or CPU). In some implementations, the processor 108 can include a graphics processor (e.g., a graphics processing unit or GPU). Although a single processor is shown, the apparatus 102 can use multiple processors. For example, the processor 108 can include multiple processors distributed across multiple machines (each machine having one or more processors) that can be directly coupled or indirectly connected via a network (e.g., a local area network). The memory 110 can include any transitory or non-transitory device capable of storing codes and data that can be accessed by the processor (e.g., via a bus). The memory 110 herein can be a random-access memory (RAM), a read-only memory (ROM), an optical/magnetic disc, a hard disk, a solid-state drive, a flash drive, a security digital (SD) card, a memory stick, a compact flash (CF) card, or any combination of any suitable type of storage device. In some implementations, the memory 110 can be distributed across multiple machines, such as in the case of a network-based memory or cloud-based memory. The memory 110 can store data (not shown), an operating system (not shown), and an application (not shown). The data can include any data for processing (e.g., an audio stream, a video stream, or a multimedia stream). The application can include programs that permit the processor 108 to implement instructions to generate control signals for performing functions of the methods in the following description.

In some implementations, the apparatus 102 can further include a secondary (e.g., external) storage device (not shown). The secondary storage device can provide additional memory when high processing needs exist. The secondary storage device can include any suitable non-transitory computer-readable medium, such as a memory card, a hard disk, a solid-state drive, a flash drive, or an optical disc. Further, the secondary storage device can be a component of the apparatus 102 or a shared device accessible by the apparatus 102 via a network. In some implementations, the application in the memory 110 can be stored in whole or in part in the secondary storage device and loaded into the memory 110 as needed for processing.

The I/O device 112 can be implemented in various ways. For example, the I/O device can include a display that coupled to the apparatus 102 and configured to display a rendering of graphics data. The I/O device 112 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The display can be a liquid crystal display (LCD), a cathode-ray tube (CRT), or any other output device capable of providing a visual output to an individual. The I/O device 112 can also be any device capable of receiving a visual, acoustic, or tactile signal from a user, such as a keyboard, a numerical keypad, a mouse, a trackball, a touch-sensitive device (e.g., a touch-screen), a sensor, a microphone, a camera, or a gesture-sensitive input device. In some cases, an output device can also function as an input device, such as a touchscreen display configured to receive touch-based input.

The network interface 114 can be used to communicate signals and/or data with another device (e.g., via a network 106). For example, the network interface 114 can include a wired means for transmitting signals or data from the apparatus 102 to another device. For another example, the network interface 114 can include a wireless transmitter or receiver using a protocol compatible to the wireless transmission. The network interface 114 can be implemented in various ways, such as a transponder/transceiver device, a modem, a router, a gateway, a system-on-chip (SoC), a wired (e.g., RJ-45) network adapter, a wireless (e.g., Wi-Fi) network adapter, a Bluetooth adapter, an infrared adapter, a near-field communications (NFC) adapter, a cellular network antenna, or any combination of any suitable type of device capable of providing functions of communications with the network 106. In some implementations, the network interface 114 can be a generic or general-purpose network interface that is not dedicated to a specialized network and not adapted to a specialized (e.g., closed-source, proprietary, non-open, or non-public) network protocol. For example, the network interface can be a general network interface that supports the Transmission Control Protocol/Internet Protocol (TCP/IP) communications protocol family (or "suite"). For another example, the network interface can be a general network interface that only supports the TCP/IP communications protocol family. It should be noted that the network interface 114 can be implemented in various ways and not limited to the aforementioned examples.

Similar to the apparatus 102, the apparatus 104 includes a processor 116, a memory 118, an I/O device 120, and a network interface 122. The implementations of elements 116-122 of the apparatus 104 can be similar to the corresponding elements 108-114 of the apparatus 102, respectively. The apparatuses 102 and 104 can be used as service nodes of an SDN. The apparatuses 102 and 104 can be used as control nodes of the SDN. The apparatuses 102 and 104 can also be used as end-user terminal computers (or "terminals" for simplicity) connected to the SDN. The apparatus 102 can communicate with the apparatus 104 via the network 106. The apparatuses 102 and 104 can also communicate with other apparatuses connected to the network 106. It should be noted that portions of the apparatuses 102 and 104 do not necessarily have to be implemented in the same manner.

The network 106 can be any combination of any suitable type of physical or logical networks, such as a wireless network, a wired network, a local area network (LAN), a wide area network (WAN), a virtual private network (VPN), a cellular data network, a Bluetooth network, an infrared connection, an NFC connection, or the Internet.

The network 106 can include multiple server computers (or "servers" for simplicity). The servers can be interconnected with each other. The servers can also be connected to terminals. A server directly connected to a terminal can be referred to as an "edge server." In this disclosure, the term "directly connecting" refers to establishing a connection between a first node and a second node in a network via no intermediate, routing, or forwarding node. That is, the direct connection can cause data to be sent and received between the first node and the second node without assistance or facilitation of any other node of the network. It should be noted that the "direct connection" is at the application level of the network, and establishing the "direct connection" does not excluding using assistant or facilitating apparatuses or devices, such as a gateway, a router, a switchboard, or any other routing or forwarding devices or apparatuses that do not function as application-level nodes of the network. In FIG. 1, when the apparatuses 102 and 104 are terminals, a server 124 is an edge server directly connecting the apparatus 102 to the network 106 (e.g., the Internet), and a server 126 is an edge server directly connecting the apparatus 104 to the network 106. The network 106 can include multiple edge servers and non-edge servers. It should be noted that edge servers can be directly or indirectly connected to each other in the network 106. For example, the servers 124 and 126 can be indirectly connected to each other (i.e., at least a third server is connected between the servers 124 and 126 in the network 106). It should also be noted that multiple terminals can be connected to the same edge server. For example, the server 124 can be the edge server directly connected to the apparatus 102 and the apparatus 104.

The servers 124 and 126 can be any type of general computers (e.g., server computers) that include similar components with the apparatuses 102 and 104. For example, the servers 124 and 126 can include a processor (e.g., similar to the processors 108 and 116), a memory (e.g., similar to the memories 110 and 118), an I/O device (e.g., similar to the I/O devices 112 and 120), and a network interface (e.g., similar to the network interfaces 114 and 122).

In some implementations, a software-defined network (SDN) can be implemented on the application layer of the network 106. The servers 124 and 126 can be included as nodes in the SDN. The SDN will be detailed in the description related to FIG. 2.

It should be noted that parts or components of the apparatuses 102 and 104 for real-time multimedia communications can include elements not limited to those shown in FIG. 1. Without departing from the scope of this disclosure, the apparatuses 102 and 104 for real-time multimedia communications can include more or fewer of parts, components, hardware modules, or software modules for performing functions of real-time multimedia communications.

Figure 2:
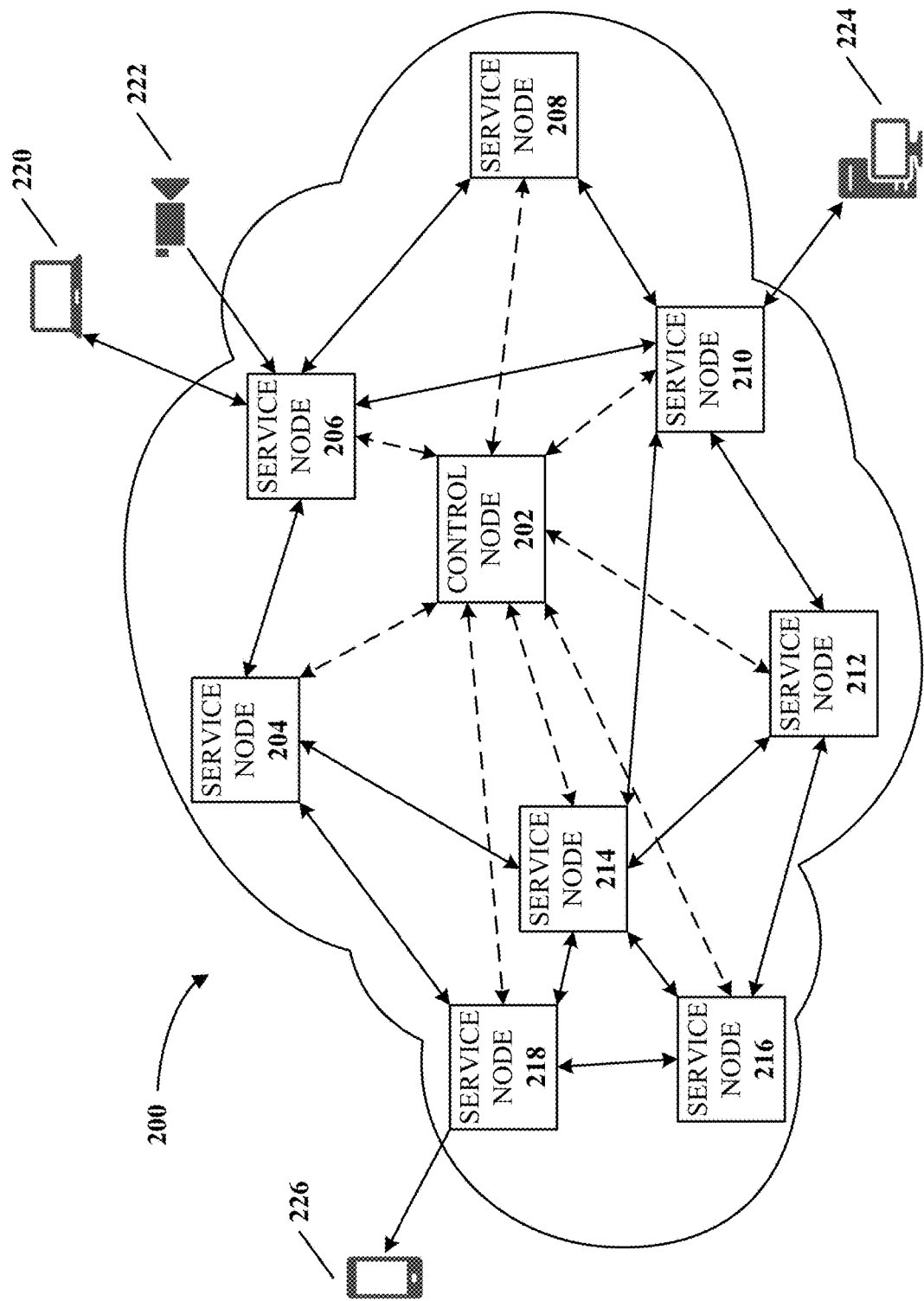
FIG. 2 is a diagram of an example software-defined network (SDN) for real-time video communications according to implementations of this disclosure.

FIG. 2 is a diagram of an example software-defined network (SDN) 200 for real-time video communications according to implementations of this disclosure. The SDN 200 is implemented on an application layer of a computing network (e.g., the network 106). For example, in a TCP/IP model, a computer-communications network can be partitioned into multiple layers. For example, in a hierarchical order from bottom to top, the multiple layers can include a physical layer, a network layer, a transport layer, and an application layer. Each of the foregoing layers serves the layer above it and is served by the layer below it. The application layer is the TCP/IP layer that directly interacts with an end user with software applications. The SDN 200 can be implemented as application-layer software modules in the network 106.

In some implementations, the SDN 200 can be implemented as software installed on nodes (e.g., the servers 124 and 126) of the network 106. In some implementations, the SDN 200 requires no dedicated or specialized hardware (e.g., a dedicated or proprietary network access point hardware) on the nodes where it is implemented. For example, the node can be any x86 or x64 computer with a Linux® operating system (OS), and the network interface of the node functioning as the access point of the SDN 200 can be any general-purpose network interface hardware (e.g., an RJ-45 Ethernet adapter, a wired or wireless router, a Wi-Fi communications adapter, or any generic network interface hardware). For example, the software modules of the SDN 200 can be installed into multiple general-purpose servers, and the servers can be shipped to different server hosting locations (e.g., data centers) for deploying the SDN 200. For example, to build a global real-time multimedia communications network, the servers can be shipped to different countries.

In addition, the network 106 where the SDN 200 is built on can be a public network (e.g., the Internet). In some implementations, the nodes of the SDN can be capable of communicating over the SDN 200 or the public network. In other words, the data traffic of the SDN 200 can be partially routed through the public network, not entirely within the SDN. In some implementations, all the nodes in the SDN 200 can be capable of simultaneously communicating over the SDN 200 and over the public network for the data traffic.

By implementing the SDN 200 as software modules on general computers over the public network, the deployment of the SDN 200 for its users can be simple, fast, efficient, and low-cost to the users (e.g., no cost for the dedicated hardware or specialized network services for building up the SDN).

In FIG. 2, the SDN 200 includes two types of nodes: service nodes and control nodes. The service nodes (e.g., service nodes 204-218) are used for receiving, forwarding, and delivering multimedia data from and to different user terminals. The control nodes (e.g., a control node 202) are used for controlling the network traffic. Though not fully shown in FIG. 2, the service nodes and the control nodes can be interconnected with each other. For example, for an SDN having N nodes, there can be least N×(N−1) direct connections among them. That is, any two nodes in the SDN can be directly connected. The connections between the nodes can be bidirectional. The connection between the nodes can also be unidirectional. The connections between the nodes can be sometimes bidirectional and sometimes unidirectional. It should be noted that the direction of network traffic between the nodes of the SDN are not limited to the examples described in this disclosure.

The connections between the nodes of the SDN 200 can be shown as lines connected between the service nodes and the control nodes in FIG. 2. The solid lines with double arrows can represent bidirectional interconnections between the service nodes. In some implementations, the bidirectional interconnections between the service nodes can also transmit data for determining transmission capacity, which will be detailed in FIGS. 3-10 and related description. The dash lines with double arrows can represent bidirectional connections between the service nodes and the control nodes. The control node can receive data for transmission capacity determination from the service nodes and can send optimal paths to the service nodes. In this disclosure, the term "transmission capacity" refers to existing (or "used") or potential (or "remained-for-use") capability or ability to perform network data transmissions. The transmission capability of a node refers to existing or potential capability or ability of the node to forwarding (e.g., receiving and resending) network data. The transmission capability between a first node and a second node refers to at least one of: existing or potential capability or ability of the first node to transmitting network data from the first node to the second node, and existing or potential capability or ability of the second node to transmitting network data from the second node to the first node. It should be noted that the SDN 200 can be implemented as having any number of any type of nodes with any configurations of interconnections, not limited to the example as shown in FIG. 2.

The service nodes can be further divided into two types: edge service nodes (or "edge nodes" for simplicity) and router service nodes (or "router nodes" for simplicity). An edge node is directly connected to an end-user terminal (or "terminal" for simplicity), such as terminals 220-226. The terminals can include any end-user device capable of multimedia communications, such as a smartphone, a tablet computer, a camera, a display, a laptop computer, a desktop computer, a workstation computer, or an apparatus with a multimedia I/O device. In FIG. 2, the service node 206 is an edge node of the terminals 220 and 222. The service node 210 is an edge node of the terminal 224. The service node 218 is an edge node of the terminal 226. The connections between the terminals 220-226 and their respective edge nodes are shown as single-arrow or double-arrow solid lines. The arrows represent the directions of the multimedia data. For example, for the terminal 220 and 224, the double-arrow solid lines represent that they have bidirectional communications with the service nodes 206 and 210, respectively. For the terminal 222, the single-arrow solid line represents that it is sending data to the service node 206. For the terminal 226, the single-arrow solid line represents that it is receiving data from the service node 218.

A router node is not directly connected to any terminal. The router note participates in forwarding data, such as the service nodes, 204,208, and 212-216. In some implementations, a service node can switch between roles of an edge node and a router node in different time, or function as both at the same time. For example, the service node 206 is the edge node of the terminal 220 for a first transmission path from the terminal 222 to the terminal 224 via the service node 206 and the service node 210. The service node 206 is a router node for a second transmission path from the terminal 224 to the terminal 226 via the service node 210, the service node 206, the service node 204, and the service node 218. When the first and second transmission paths are simultaneously active, the service node 206 can function as both an edge node and a router node.

In some implementations, the edge nodes of the SDN 200 can be connected to an autonomous system (AS) operated by an Internet service provider (ISP). The topology of the SDN 200 can be divided into hierarchical groups based on geographic locations of the service nodes, AS's, and ISP's. The data transmission of the SDN 200 can be categorized into two types: inter-node transmission (i.e., network traffic between service nodes) and terminal-node transmission (i.e., network traffic between edge nodes and terminals). Various strategies can be implemented to optimize the inter-node and terminal-node transmission, which is disclosed in the U.S. patent application Ser. No. 15/052,810, filed on Feb. 24, 2016, the content of which is herein incorporated by reference in its entirety.

In some implementations, a system based on an SDN can be used for real-time multimedia communications. The system can be built based on the SDN (e.g., the SDN 200), and include multiple service nodes (e.g., the service nodes 204-218) and at least one control node (e.g., the control node 202). The service nodes can include edge nodes (e.g., the service nodes 206, 210, and 218) and router nodes (e.g., the service nodes 204, 208, and 212-216). Any service node of the SDN can switch between its role between an edge node and a router node.

Parameters indicative of transmission capacities can be determined between the service nodes and can be transmitted to the control nodes for determining optimal data-transmission paths (referred to as "optimal paths" for simplicity) between the service nodes. The parameters can be referred to as "path metrics" hereinafter. The path metrics can be monitored in a repetitive manner (e.g., a periodic or non-periodic repetitive manner). In some implementations, the path metrics can be repetitively determined between any two directly-connected service nodes of the SDN by a time gap. In some implementations, the time gap can be a constant number (e.g., tens of milliseconds). In some implementations, the time gap can be dynamically adjusted, such as in accordance with transmission load of the SDN (e.g., the time gap is increased as the transmission load decreases or vice versa).

In some implementations, the path metric can include a load status of a service node and a transmission metric (e.g., for a unidirectional or bidirectional transmission) between the service node and another service node. The load status can include one or more parameters indicative of a load of the service node. For example, the load status can include any number of any combination of an available throughput of the service node and a health status of the service node. The transmission metric can include a statistical or event-wise parameter indicative of transmission capacity between the service nodes. For example, the transmission metric can include any number of any combination of a latency, a packet-loss ratio, a network traffic load, and a transmission quota.

The path metrics can be determined between any two service nodes using an active mode, a passive mode, or a combination thereof. In the active mode, any two directly-connected service nodes of the SDN can mutually send and receive test data packets (e.g., dummy data packets with stuffing data), such as using a routing protocol. By performing the calculation using the received test data packets, the transmission metric (e.g., a latency, or a packet-loss ratio) can be determined. For example, by dividing a total size of received test data packets and a total size of the test data packets included in the packet headers thereof, the packet-loss ratio can be determined. In the passive mode, no test data packets are used, and actual user data packets are transmitted between the service nodes. For two directly-connected service nodes, the transmission metric can be determined by performing the calculations using the user data packets. It should be noted that, for bidirectional communications, a first transmission metric associated with transmission from the first service node to the second service node can be different from a second transmission metric associated with transmission from the second service node to the first service node. That is, the first transmission metric and the second transmission metric can be separately and independently determined. Such transmission metrics can be referred to as "asymmetric" for the bidirectional communications. Otherwise, the transmission metric can be referred to as "symmetric" when the first transmission metric is set to be the same as the second transmission metric (e.g., only the first transmission metric is monitored). By determining the path metrics, bidirectional communications quality between any two directly-connected service nodes in the SDN can be monitored and updated in real time.

In some implementations, the transmission metric can be determined between the service nodes over connections established in the SDN, which can be referred to as an "internal transmission metric." In some implementations, the transmission metric can be determined between the service nodes over non-SDN connections (e.g., a direct Internet connection), which can be referred to as an "external transmission metric." It should be noted that any number of any combination of the internal transmission metric and the external transmission metric can be considered to determine the path metric. The internal and external transmission metrics can be used to decide whether to route multimedia data between two service nodes over a non-SDN connection or an SDN connection. In other words, the non-SDN connection can function as an alternative routing option to the SDN connection, or vice versa.

The determined path metrics can be reported to the control nodes. For example, whenever a transmission metric (e.g., an asymmetric transmission metric) is determined by a service node between the same and another service node, the service node can instantly transmit the path metric to the control nodes. Also, the load status of a service node can be repetitively monitored and transmitted to the control node (e.g., together with the transmission metric). Based on the path metrics, the control nodes can determine optimal paths between the service nodes. In some implementations, when the path metrics are measured and transmitted to the control nodes by a period (e.g., in a period of tens of milliseconds), the optimal path can also be determined by the same period. The optimal paths can also be determined further based on prior knowledge (e.g., prior determined optimal paths). In some implementations, an optimal path can be determined between any two service nodes of the SDN. In some implementations, multiple optimal paths can be determined between any two service nodes of the SDN.

In some implementations, the optimal paths can be symmetric (e.g., for unidirectional communications). That is, the optimal path from the first edge node to the second edge node is the reversal of the optimal path from the second edge node to the first edge node. In some implementations, the path can be asymmetric (e.g., for bi-directional communications). That is, the optimal path from the first edge node to the second edge node is not the reversal of the optimal path from the second edge node to the first edge node. When the determined transmission metric is symmetric, the optimal path can be symmetric. When the determined transmission path metric is asymmetric, the optimal path can be asymmetric.

For example, an SDN can support bidirectional communications and include N edge nodes, in which N is a positive integer. Asymmetric path metrics can be determined between any two directly-connected service nodes. Based on the path metrics, at least N×(N−1) optimal paths can be determined. In some implementations, for any two of the service nodes, K asymmetric optimal paths can be determined, in which K is a positive integer. The K optimal paths can have different latency values. In some implementations, the K optimal paths can be ordered by the latency values (e.g., in an ascending order), which can serve to each other as alternative paths. For example, when the lowest-latency path of the K optimal paths used for data transmission becomes unavailable (e.g., disconnected or a latency thereof sharply increases), the second-lowest-latency path can be switched to continue the data transmission.

After determining the optimal paths, the control nodes can synchronize path data to the service nodes, which includes information on the optimal paths. In some implementations, the path data can be implemented in the form of a routing table. In some implementations, the path data can be synchronized to all the service nodes of the SDN. The synchronization of the path data can be implemented in a propagation scheme.

For example, in FIG. 2, the control node 202 can send the path data (e.g., stored in a routing table) to all edge nodes of the SDN 200, including the service node 210 functioning as the edge node of the terminal 224. For data transmission from the terminal 224 to the terminal 220, the optimal path can be determined as the service nodes 210-208-206. In this disclosure, a transmission path is represented by a name of a node connected by a hyphen along the direction of the path. For example, a transmission path from node A to nodes B, C, and D, can be represented by "A-B-C-D." When the service node 210 receives user data (e.g., multimedia data) from the terminal 224, the path data can be attached to packet headers of the user data. The user data can be transmitted to the service node 208 that serves as a router node. The service node 208 can obtain the path data from the packet headers of the user data, and extract the optimal path 210-208-206 by processing the path data (e.g., by reading from the routing table). Based on the optimal path, the service node 208 can forward the user data to a next service node of the optimal path, in which the packet headers of the user data also include the path data. The next service node can repeat the same operation to obtain the optimal path and forward the user data until the edge node of the terminal 224 is reached, which is the service node 206 in this example. The service node 206 can deliver the user data to the terminal 224.

In some implementations of this disclosure, the control nodes can select a service node as an edge node for connecting a terminal to the SDN. The connection between the terminal and the edge node is a non-SDN connection (e.g., an Internet connection). By receiving the path metrics, the control nodes can have real-time performance statistics of the SDN. The edge node can be selected from one or more candidate edge nodes based on at least one consideration factor of a prior optimal path that is associated with the terminal (e.g., the edge node used by the terminal in the prior optimal path can be a candidate edge node for the current selection), a rule of a network operator associated with the SDN (e.g., a rule that requires all terminals to be connected to a specific service node), a geographical location of the terminal, a geographical location of a candidate service node, and a path metric associated with the candidate edge node. It should be noted that the consideration factors are not limited to the aforementioned examples and can be any factor related to transmission capacity. The control nodes can assign different priority levels to the consideration factors for determining the edge node.

For example, in FIG. 2, when the terminal 226 connects to the SDN 200 and initiates a multimedia data transmission to the terminal 220, service nodes 212-218 can be its candidate edge nodes and they can have different strengths in the consideration factors. The service node 212 can have the lowest connection latency to the terminal 226. The service node 214 can have been used as the edge node of the terminal 226 in a prior optimal path. The service node 216 can have the lightest current transmission load among the service nodes 212-218. The service node 218 can have the smallest geographic distance to the terminal 226. When the control nodes assign the highest priority to geographic distance between the terminal 226 and a service node, the service node 218 can be selected as the edge node thereof. When the control nodes assign the highest priority to transmission loads of a service node, the service node 216 can be selected as the edge node thereof. When the control nodes assign the highest priority to a prior used edge node, the service node 214 can be selected as the edge node thereof. When the control nodes assign the highest priority to connection latency, the service node 212 can be selected as the edge node thereof. It should be noted that the control nodes can also synthesize the priority levels of the candidate edge nodes for determining the edge node. For example, each consideration factor can also be assigned with a weight to represent its priority level. Under each consideration factor, the control nodes can assign a score to a candidate edge node to represent its strength in that consideration factor. For each candidate edge node, multiple scores can be assigned for multiple consideration factors, and a total score can be determined from the multiple scores it is assigned, such as by calculating a weighted sum between its multiple scores and the weights of respective consideration factors. Based on the total scores of the candidate edge nodes, the control nodes can select the edge node based on a rule (e.g., selecting the candidate edge node that receives the highest or lowest total score).

In some implementations, after an edge node is selected for a terminal, the terminal can be authenticated before being connected to the SDN. For example, the edge node can be configured to authenticate the terminal. The authentication can be based on at least one of a permission of connecting the terminal to the SDN, a time limit of connecting the terminal to the SDN, a permission to send data by the terminal, and a permission to receive data by the terminal. For example, a fee can be charged to a user to use the SDN. A paying user can be assigned an access privilege (e.g., a username and a password) by an administrator of the SDN. The access privilege can include various permissions to the paying user for using the SDN. For example, the permission can limit the user to be capable of sending data only, receiving data only, using the SDN for a limited time only, or freely using the SDN without any limit. Different fees can be charged for different access privileges. Requests from the paying user to use the SDN with unauthorized permissions can be rejected. Unauthorized users (e.g., non-paying users or malicious attackers) can be blocked to be connected to the SDN.

In some implementations, the control nodes can also authenticate the connected terminals based on the contents of the user data. For example, the service nodes can sample the transmitted multimedia data, such as by taking a snapshot of a video stream or a sample of an audio stream. The sampled data can be periodically sent to the control nodes, which can detect (e.g., by using an artificial intelligence algorithm) whether illegal, inappropriate, or rule-violating contents exist in the multimedia data. When such contents are detected, the control nodes can terminate the access privileges of the violating terminals.

In some implementations of this disclosure, the control nodes can automatically adjust routing modes for multimedia data transmission between the service nodes based on channel conditions. Users of the SDN 200 can send and receive multimedia data in different data communications channels (e.g., a duplex data channel). A channel can be used by a communications event (e.g., a concert, a conference, or a live broadcasting show) for users to exchange multimedia data between each other. The users in the same channel participate in the same event. In some cases (e.g., the event has a large number of users), multiple channels can be used for the same event. Each channel of the SDN 200 can be assigned by the control nodes with a unique identifier, referred to as a "channel ID." User data associated with the same channel ID can be aggregated for transmission. A service node can also serve for different channels simultaneously.

For example, in FIG. 2, users of the terminals 220-226 can participate in an online education class, for which a duplex channel with a unique channel ID can be established. The terminals 220 and 222 connect to the same edge node (i.e., the service node 206), and the user data sent and received by the terminals 220 and 222 can be aggregated by the service node 206 for transmission.

For another example, in FIG. 2, users of the terminals 220 and 224 can participate in a conference, and users of the terminals 222 and 226 can participate in a live concert. Channels with respective unique channel IDs can be established for those two events. The terminals 220 and 222 connect to the same edge node (i.e., the service node 206), but the user data sent and received by the terminals 220 and 222 are not aggregated by the service node 206 for transmission.

In some implementations, the control node can switch the routing modes for the service nodes in the same channel between a unicast mode, a multicast mode, and a broadcast mode. The control nodes can synchronize information of participating terminals of the channel with the service nodes in the channel. For example, the multicast mode can be used as a default transmission mode by the SDN 200. When the channel includes only two terminals (i.e., the communications of them is one-to-one), the multicast mode can be automatically reduced to the unicast mode. When the channel includes only one data sending terminal (i.e., the communications is unidirectional and one-to-many), the multicast mode can be automatically reduced to the broadcast mode. In other words, the unicast mode and the broadcast mode can be deemed as simplified cases of the multicast mode.

In some implementations, when the volume of exchanged multimedia data of the channel exceeds a threshold, or when the number of the users in the channel exceeds a threshold, a cascade network topology can be used for data transmission in the multicast mode. The cascade network topology is a tree-like network topology representing connections between the service nodes. The cascade network topology can be dynamically configured as the transmission capacity of the SDN changes. By using the cascade network topology, excessive or redundant data forwarding can be reduced or avoided in the SDN.

Figure 3:
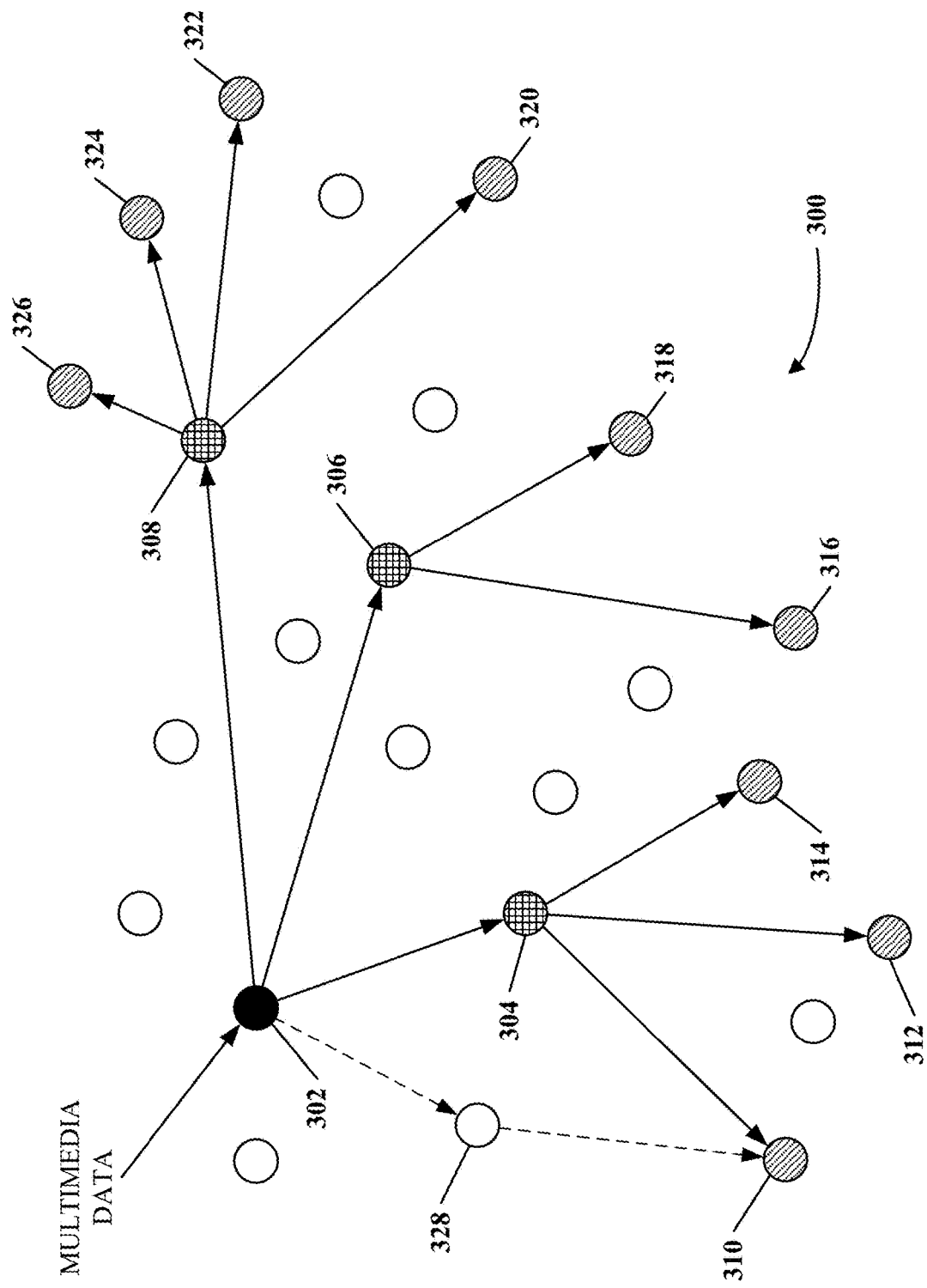
FIG. 3 is a diagram of an example cascade network topology for real-time video communications according to implementations of this disclosure.

FIG. 3 is a diagram of an example cascade network topology 300 for real-time video communications according to implementations of this disclosure. The cascade network topology 300 can be used for data transmission in an SDN (e.g., the SDN 200 in FIG. 2). The cascade network topology 300 can be determined by control nodes of the SDN (e.g., the control node 202 in FIG. 2). In FIG. 3, the cascade network topology 300 is represented by service nodes 302-326 and the lines connecting them. In FIG. 3, a sender 302 can receive multimedia data (e.g., from a sending terminal) and send the same to receivers 310-326 through routers 304-308. The receivers 310-326 can receive the multimedia data sent by the sender 302 and forwarded by the routers 304-308, and further send the multimedia data to receiving terminals targeted by the sending terminal. The sender, receivers, and routers can be the service nodes of the SDN. For example, the sender 302 and the receivers 310-326 can be edge nodes of the SDN 200. The routers 304-308 can be router nodes of the SDN 200. In FIG. 3, a path or route that links the sender 302 and any of the receivers 310-326 can represent an optimal path between the sender 302 and that receiver. In some implementations, the optimal path can include no router node (i.e., a sender is directly connected to a receiver).

The lines connecting the service nodes 302-306 can represent direct network connections (e.g., direct SDN connections) between them. The cascade network topology 300 can be determined based on optimal paths between the senders and the receivers. When the optimal paths are symmetric, the same cascade network topology can be used by all its service nodes for data sending and receiving, and the cascade network topology can be referred to as "symmetric." When the optimal paths are asymmetric, different cascade network topologies can be determined for different senders, and the cascade network topologies can be referred to as "asymmetric." That is, an asymmetric cascade network topology is used for unidirectional data transmission. In FIG. 3, when the cascade network topology 300 is asymmetric, the unidirectional data transmission is represented by the single-arrow lines connecting the service nodes 302-326. In other words, the cascade network topology 300 is associated with the sender 302. When the service nodes 302-326 are in bidirectional communications (e.g., the sender 302 also receives user data from one of the receivers 310-326), for any edge node that sends user data, a different cascade network topology can be determined and associated.

In some implementations, the cascade network topology 300 can include both SDN connections and non-SDN connections. For example, the direct network connections in the cascade network topology 300 can include direct Internet connections between its service nodes. For ease of explanation without causing any ambiguity, hereinafter, the direct network connections in the cascade network topology 300 are assumed to be direct SDN connections unless explicitly stated otherwise.

The cascade network topology 300 can be determined based on the path metric determined by the control nodes. In some implementations, the cascade network topology can be determined for a sender and multiple receivers by the control nodes based on the path metrics measured between the sender and the receivers, and each path of the determined cascade network topology can represent an optimal path. For example, when user data is sent from the terminal 222 to the terminals 224 and 226 in FIG. 2, an asymmetric optimal path 206-208-210 can be determined between the terminals 222 and 224. The edge node of the terminal 222 is the service node 206, which can be represented by the sender 302 in FIG. 3. The edge node of the terminal 224 is the service node 210, which can be represented by the receiver 318 in FIG. 3. The router node of the optimal path 206-208-210 is the service node 208, which can be represented by the router 306 in FIG. 3. For the sender (i.e., the service node 206), the cascade network topology 300 can be determined by the control nodes to include optimal paths between the sender and its receivers (e.g., the service nodes 210 and 218). The optimal path 206-208-210 can be included in the cascade network topology 300, represented by a path 302-306-318.

In some implementations, the cascade network topology 300 can be dynamically configured based on transmission capacity changes indicated by the path metrics. For example, in FIG. 3, during a first time period, the router 304 is selected for the optimal path between the sender 302 and the receiver 310, represented by a path 302-304-310. The path metrics between the sender 302 and other service nodes in the same SDN can be periodically monitored. Multiple candidate optimal paths can be determined between the sender 302 and the receiver 310. For example, the multiple candidate optimal paths can include K optimal paths that have different total latencies from the sender 302 to the receiver 310. The K optimal paths can include the path 302-304-310, a path 302-328-310 (shown by dash lines with arrows), and other candidate paths (not shown). During the first time period, the path 302-304-310 has the lowest latency from the sender 302 to the receiver 310.

After the first time period, assuming the measured path metrics indicates that, the total latency of the path 302-328-310 becomes the lowest among the K optimal paths, the control nodes can update the cascade network topology 300 by changing the optimal path from the sender 302 to the receiver 310 to be the path 302-328-310. The path 302-304-310 can be removed from the updated cascade network topology 300. The new path 302-328-310 can be synchronized to at least the router 328 and can be used to transmit user data for a second time period.

In some implementations, for error resilience, the multimedia data can be transmitted using redundant transmission. In some cases, service nodes of the SDN can fail unexpectedly (e.g., due to a power outage). To avoid interruption of data transmission, the user data can be duplicated for transmission. For example, the cascade network topology 300 can be modified in a way that, multiple service nodes can be grouped to form a "service cluster." The user data can be transmitted between service clusters, and the unit or "node" of the optimal paths is a service cluster.

For example, the cascade network topology 300 can be modified in a way that, each circle in FIG. 3 can represent a service cluster (i.e., not a single service node). When the user data is transmitted between the service clusters 306 and 316, the user data is actually transmitted between a current service node of the service cluster 306 and a service node of the service cluster 316. At the service cluster 306, the user data can be duplicated to multiple service nodes, for example. The duplicated user data can be independently transmitted to multiple corresponding service nodes in the service cluster 318. When the current service node of the service cluster 306 fails, the user data can still be transmitted to the service cluster 318 by other service nodes without causing transmission interruption.

When arriving at a receiver (e.g., the edge node of a receiving terminal), the duplicate user data can be filtered (e.g., by precluding damaged bits of packets) and/or merged (e.g., by combining bits of the packets) to obtain complete user data representing the original content. Then the complete user data can be transmitted to the second terminal.

As shown in FIG. 3, by using the cascade network topology 300, excessive or redundant data forwarding can be reduced or avoided in the SDN because user data streams between the sender and the receivers can be aggregated. For example, when the sender 302 is sending data to the receivers 320-326, the data need not to be transmitted in multiple duplicate copies. Instead, one copy of the data can be transmitted from the sender 302 to the router 308, and the router 308 can generate four local copies of the data, then transmit them to the receivers 320-326, respectively. By dynamically configuring the cascade network topology 300 based on transmission capacity changes, network bandwidths between the service nodes can be saved, network traffic congestion in the SDN can be automatically remedied, and network transmission latency between the edge nodes can be reduced to a minimal level.

Figure 4:
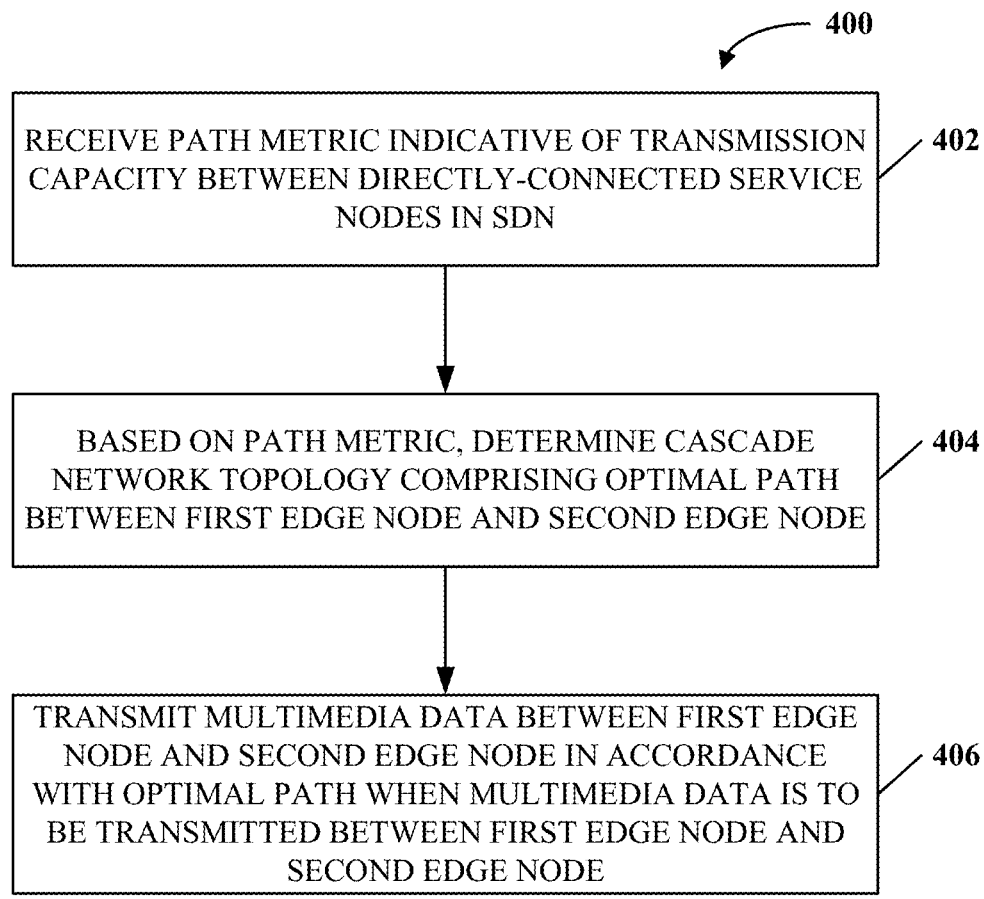
FIG. 4 is a flowchart of an example process for real-time video communications according to implementations of this disclosure.

FIG. 4 is a flowchart of an example process 400 for real-time video communications using an SDN according to implementations of this disclosure. The process 400 can be implemented as software and/or hardware modules in the system 100 in FIG. 1. For example, the process 400 can be implemented as software modules of a server (e.g., the server 124). For another example, the software modules implementing the process 400 can be stored in a memory (e.g., the memory of the server 124) as instructions and/or data executable by a processor (e.g., the processor of the server 124) of the server with a general network interface. In some implementations, the server can be a control node (e.g., the control node 202 in FIG. 2) of the SDN.

At operation 402, a path metric indicative of transmission capacity between directly-connected service nodes in the SDN is received. For example, the SDN can be the SDN 200 in FIG. 2. The directly-connected service nodes can include a first service node and a second service node. The first and second service nodes can be any two service nodes (e.g., any two directly-connected service nodes) of the SDN 200, such as the service node 206 and the service node 208, respectively.

The path metric can be received by a processor of a control node (e.g., the control node 202). In some implementations, the path metric can include a load status of at least one of the directly-connected service nodes (e.g., the first service node and/or the second service node). The path metric can also include a transmission metric (e.g., a bidirectional transmission metric) between at least two of the directly-connected service nodes (e.g., the first service node and the second service node).

In some implementations, the transmission metric (e.g., the bidirectional transmission metric) can be determined using at least one of user data (e.g., multimedia data) and test data. The user data and the test data can be transmitted between the directly-connected service nodes (e.g., the first service node and the second service node). For example, the transmission metric can be determined using the active mode, in which the test data is used. The transmission metric can be determined using the passive mode, in which the user data is used. The transmission metric can also be determined using the active mode and the passive mode together. The active mode and the passive mode have been set forth in descriptions related to the SDN 200 in FIG. 2.

In some implementations, network interface hardware of nodes of the SDN (e.g., the first service node and the second service node) can be general-purpose network interface hardware. The general-purpose network interface can be used for accessing to a public network that is open to public access, such as the Internet. For example, the network interface hardware can be the network interfaces 114 and 122 in FIG. 1. In some implementations, the network interface hardware can include no support to any specialized (e.g., closed-source, proprietary, non-open, or non-public) network protocol. In some implementations, network interface hardware of all the service nodes and the control nodes of the SDN can be the general-purpose network interface hardware.

At operation 404, a cascade network topology is determined based on the path metric, and a cascade network topology includes an optimal path between a first edge node and a second edge node. The optimal path can have the lowest transmission latency (or "latency" for simplicity) among data transmission paths in the SDN between the first edge node and the second edge node. The optimal path can include at least one of the first service node and the second service node. For example, when the first edge node is sending user data to the second edge node, the cascade network topology can be the cascade network topology 300 in FIG. 3. A first terminal and a second terminal can be directly connected to the first edge node and the second edge node, respectively. The first terminal can be the terminal 222 in FIG. 2 connected to the service node 206 (i.e., the first edge node) that can be represented by the sender 302 in FIG. 3. The second terminal can be the terminal 224 connected to the service node 210 (i.e., the second edge node) that can be represented by the receiver 322 in FIG. 3. The optimal path between the first edge node and the second edge node can be 206-208-210 in FIG. 2, in which the service node 208 can be represented by the router 308 in FIG. 3. The optimal path 206-208-210 can be represented by a path 302-308-322 in the cascade network topology 300. That is, the cascade network topology 300 includes the optimal path 206-208-210. In some implementations, the optimal path can be implemented as one or more entries in a routing table. The entries can include IP addresses, for example.

In some implementations, the path metric can be determined as symmetric or asymmetric. When the path metric determined at the operation 402 is asymmetric, the optimal path determined at the operation 404 can be asymmetric. In some implementations, multiple optimal paths can be determined between a sender and a receiver in the cascade network topology. In some implementations, the multiple optimal paths can have different latency values between the sender and the receiver.

In some implementations, the cascade network topology can be a recursive cascade topology. In a recursive cascade topology, each node can have at most one input (i.e., where the user data is transmitted from) and at least one output (i.e., where the user data is transmitted to). In some implementations, when the path metric determined at the operation 402 is asymmetric, the cascade network topology can be asymmetric. In some implementations, the cascade network topology can include only one optimal path (e.g., when the SDN is transmitting data in the unicast mode).

At operation 406, based on a determination that multimedia data is to be transmitted between the first edge node and the second edge node, the multimedia data is transmitted between the first edge node and the second edge node in accordance with the optimal path. For example, the cascade network topology includes the optimal path 206-208-210, with which the multimedia data can be transmitted from the first edge node (i.e., the service node 206) to the second edge node (i.e., the service node 210). When the first terminal (i.e., the terminal 222) is trying to send multimedia data to the second terminal (i.e., the terminal 224), the multimedia data can be transmitted through the optimal path 206-208-210. If the cascade network topology is symmetric, the multimedia data can also be transmitted from the second edge node to the first edge node using the optimal path 206-208-210. For another example, the cascade network topology can be asymmetric and includes an optimal path 210-214-204-206, with which the multimedia data can be transmitted from the second edge node to the first edge node.

In some implementations, for error resilience, a first packet of the multimedia data is transmitted in accordance with a first path, and a second packet of the multimedia data is transmitted in accordance with a second path. The first packet and the second packet are duplicate packets. The first path and the second path are transmission paths between the first edge node and the second edge node, and the first path is different from the second path.

When the first packet and the second packet arrives at the edge node of the second terminal, the first packet and the second packet can be filtered (e.g., by precluding damaged bits of packets) and/or merged (e.g., by combining bits of packets) to obtain a complete packet representing the original content. Then the complete packet can be transmitted to the second terminal.

Figure 5:
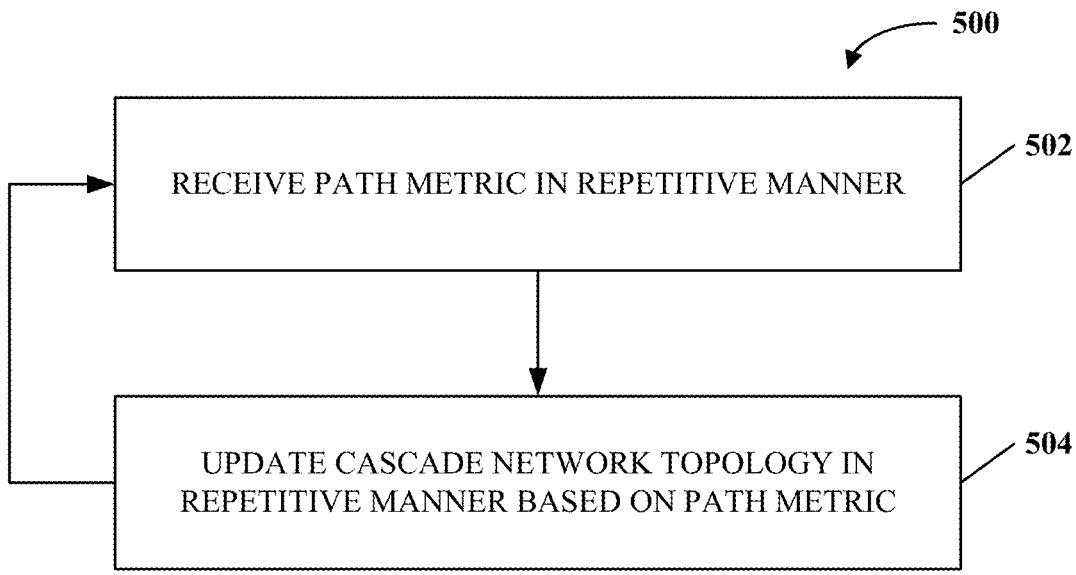
FIG. 5 is a flowchart of an example process for updating a cascade network topology according to implementations of this disclosure.

In some implementations, the cascade network topology can be dynamically updated based on updated path metric received by the control node. FIG. 5 is a flowchart of an example process 500 for updating a cascade network topology according to implementations of this disclosure. The process 500 can be implemented as software and/or hardware modules in the system 100 in FIG. 1. For example, the process 500 can be implemented as software modules of a server (e.g., the server 124). For another example, the software modules implementing the process 500 can be stored in a memory (e.g., the memory of the server 124) as instructions and/or data executable by a processor (e.g., the processor of the server 124) of the server with a general network interface. In some implementations, the server can be a control node (e.g., the control node 202 in FIG. 2) of the SDN.

At operation 502, the path metric can be received in a repetitive manner. The path metric can be measured and updated in the repetitive manner by the first service node and the second service node. The updated path metric can then be transmitted to the processor of the control node. In some implementations, the repetitive manner can be a periodic manner. The period can be a fixed period (i.e., that has a fixed time interval) or a variable period (i.e., that has a non-fixed time interval). For example, the path metric can be periodically received by the processor of the control node. In some implementations, the path metric between any two of the service nodes of the SDN can be periodically determined and transmitted to the processor of the control node for monitoring the network traffic between the two.

At operation 504, the cascade network topology can be updated in the repetitive manner based on the updated received path metric. For example, the cascade network topology can be updated by updating the optimal path between the first edge node and the second edge node. The updated optimal path can have more router nodes, fewer router nodes, or replaced router nodes. If the path metric is updated and received in the periodic manner, the period of updating the cascade network topology can be the same as the period of updating the path metric. The period of updating the cascade network topology can also be different from (e.g., twice longer as) the period of updating the path metric. It should be noted that the repetitive manner of updating the path metric and the cascade network topology can have various implementations and not limited to the above examples.

In some implementations, the SDN can determine a service node as an edge node for connecting a terminal (e.g., the first terminal) to the SDN. The edge node can be selected from a pool of service nodes that serve as candidate edge nodes. The selection of the edge node for the terminal can be based on at least one of a prior optimal path associated with the first terminal (e.g., the optimal path including a service node that previously served as the edge node of the first terminal), a rule of a network operator associated with the SDN, a geographical location of the first terminal, a geographical location of a candidate edge node, and a path metric associated with the candidate edge nodes.

Figure 6:
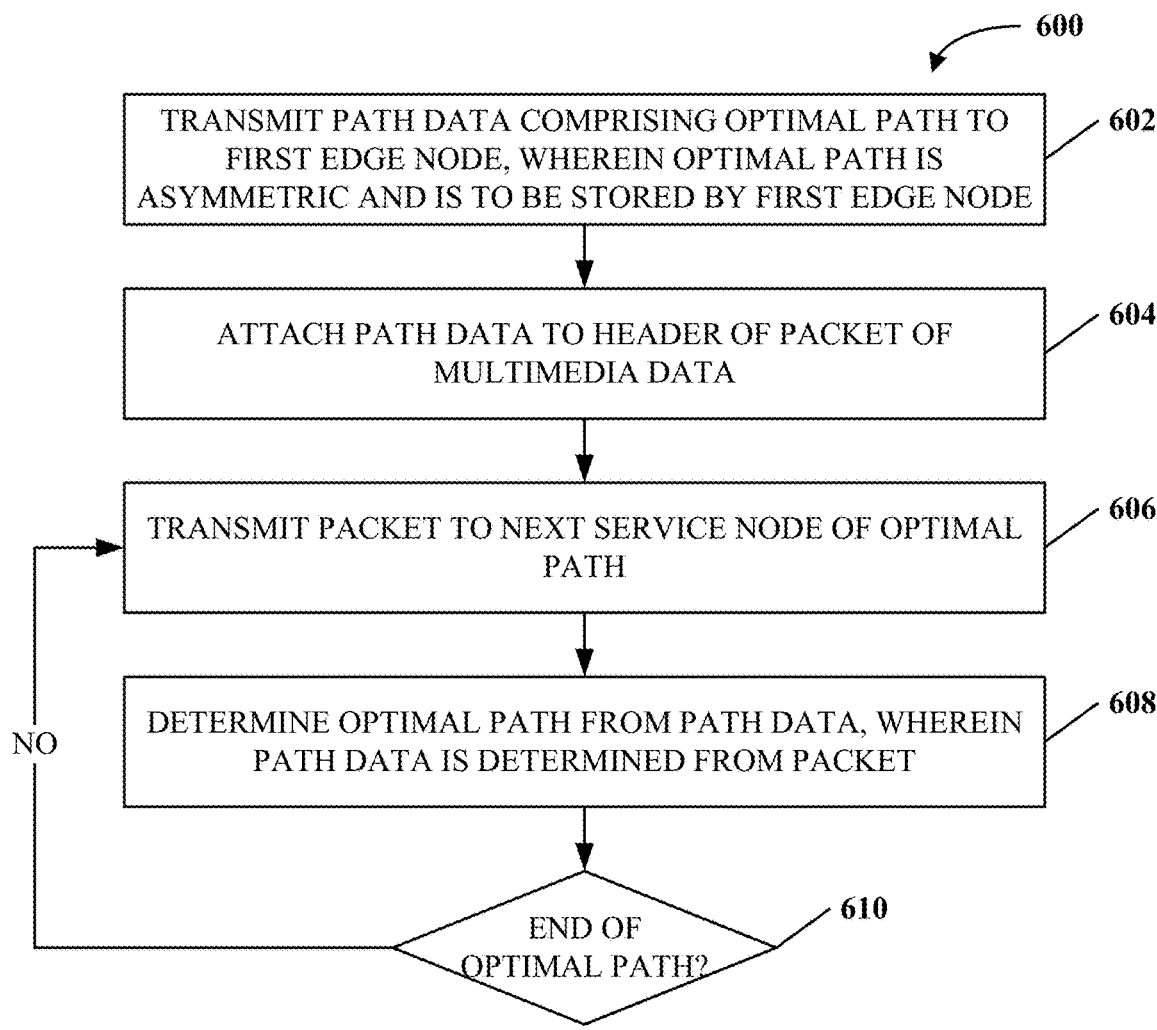
FIG. 6 is a flowchart of an example process for transmitting multimedia data according to implementations of this disclosure.

When the edge node is determined for the terminal, a connection (e.g., a direct connection) between the terminal and the edge node can be established. The optimal path and the multimedia data can be transmitted to the service nodes (i.e., router nodes and edge nodes) as follows. FIG. 6 is a flowchart of an example process 600 for transmitting multimedia data according to implementations of this disclosure. The process 600 can be implemented as the operation 504 in the process 500. The process 600 can be implemented as software and/or hardware modules in the system 100 in FIG. 1. For example, the process 600 can be implemented as software modules of a server (e.g., the server 124). For another example, the software modules implementing the process 600 can be stored in a memory (e.g., the memory of the server 124) as instructions and/or data executable by a processor (e.g., the processor of the server 124) of the server with a general network interface. In some implementations, the server can be a control node (e.g., the control node 202 in FIG. 2) of the SDN.

At operation 602, based on a determination that the multimedia data is to be transmitted from the first edge node to the second edge node and the first edge node is determined for the first terminal, path data is transmitted to the first edge node. The path data can be generated by the control node and transmitted to the first edge node. The path data can include the optimal path between the first edge node and the second edge node determined by the control node. The optimal path can be asymmetric and to be stored by the first edge node. For example, the optimal path can be determined by the control node in a periodic manner. In response to determining an optimal path that includes the first edge node, the control node can transmit the path data to the first edge node in the periodic manner. The path data can include a routing table. The routing table can include the optimal path that is stored as entries of the routing table. The path data can be stored by the first edge node (e.g., in a memory of the first edge node).

At operation 604, the path data is attached to a header of a packet of the multimedia data. For example, the first edge node receives the multimedia data in form of data packets from the first terminal. The path data (e.g., a routing table) can be encoded and inserted into a field of the header of each of the packets.

At operation 606, the packet is transmitted to a next service node of the optimal path. For example, the first terminal can be the terminal 224 in FIG. 2, the second terminal can be the terminal 226, and the optimal path can be 210-212-216-218. In the optimal path 210-212-216-218, the next service node can be the service node 212. The path data can be attached to the header of the packet by the service node 210 at the operation 604.

At operation 608, the optimal path is determined from the path data (e.g., to be used by the next service node), and the path data is determined from the packet. The next service node (e.g., the service node 212) can determine the path data from the packet. For example, when the packet is received by the next service node, the service node can extract and decode the path data from the header of the packet. The next service node can further process the path data (e.g., by reading and locating entries of the routing table) to determine the optimal path. For example, based on the optimal path, the next service node can determine an IP address of a following service node (e.g., the service node 216 in the optimal path 210-212-216-218) to forward the packet. The next service node can further store (e.g., in a memory thereof) the optimal path for future use.

At operation 610, it is determined whether the next service node is the end of the optimal path. The end of the optimal path can be the second edge node of the second terminal. For example, for the optimal path 210-212-216-218, the end of the optimal path is the service node 218. If the next service node is the end of the optimal path, the process 600 ends. Otherwise, the process 600 goes back to the operation 606. That is, the operations 606-610 can be repeated until the packet is sent to the end of the optimal path, by when the second edge node can transmit the packet to the second terminal.

Figure 7:
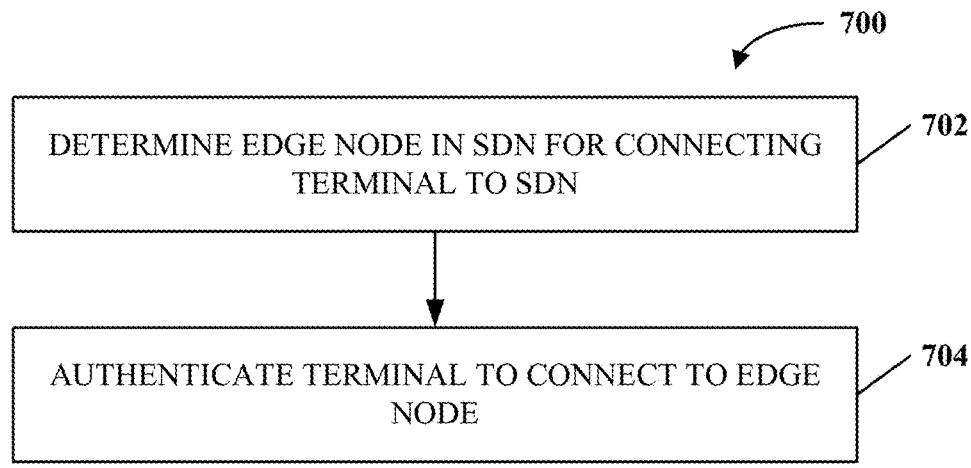
FIG. 7 is a flowchart of an example process for authenticating a terminal to the SDN according to implementations of this disclosure.

In some implementations, the SDN can authenticate a terminal before the terminal is connected to the SDN. The authentication can be performed by an edge node of the terminal, for example. FIG. 7 is a flowchart of an example process 700 for authenticating a terminal to the SDN according to implementations of this disclosure. The process 700 can be performed prior to the operation 402 in the process 400. The process 700 can be implemented as software and/or hardware modules in the system 100 in FIG. 1. For example, the process 700 can be implemented as software modules of a server (e.g., the server 124). For another example, the software modules implementing the process 700 can be stored in a memory (e.g., the memory of the server 124) as instructions and/or data executable by a processor (e.g., the processor of the server 124) of the server with a general network interface. In some implementations, the server can be an edge node of the SDN.

At operation 702, an edge node of the SDN is determined for connecting a terminal to the SDN. The authentication can be based on at least one of a permission of connecting the terminal to the SDN, a time limit of connecting the terminal to the SDN, a permission of transmitting the multimedia data by the terminal, and a permission of receiving the multimedia data by the terminal.

At operation 704, the terminal is authenticated to be connected to the edge node. For example, the edge node can perform the authentication based on a credential (e.g., a username and a password) transmitted by the terminal.

A system for real-time multimedia communications based on an SDN is also disclosed herein. For example, the SDN can be the SDN 200 in FIG. 2. The system can include a first service node (e.g., the service node 206) in the SDN, a second service node (e.g., the service node 210) in the SDN, and a control node (e.g., the control node 202) in the SDN. The control node can include a processor (e.g., the processor 116) and a memory (e.g., the memory 118) coupled to the processor. The memory can be configured to store instructions which, when executed by the processor, can become operational with the processor to perform the process 400 in FIG. 4.

In some implementations, network interface hardware of the control node, the first service node, and the second service node can be general-purpose network interface hardware. The general-purpose network interface hardware can be any network interface hardware for accessing to a public network.

In some implementations, path metric between the first service node and the second service node can be determined in a repetitive manner (e.g., a periodic manner), and the cascade network topology is updated in the repetitive manner in response to receiving the path metric.

In some implementations, for error resilience, a cascade network topology determined by the control node based on the path metric can include at least two transmission paths between the first edge node and the second edge node. For example, the routing nodes of the at least two transmission paths can be different from each other. For another example, as described in FIG. 2, the cascade network topology can represent a topology between service clusters. Each of the service clusters can include multiple service nodes. In some implementations, the at least two transmission paths can include transmission paths passing the same service clusters. For example, a first transmission path can include a first service node and a second service node in a first service cluster and a second service cluster, respectively. A second transmission path can include a third service node and a fourth service node in the first service cluster and the second service cluster, respectively. The first, second, third, and fourth service nodes are different. The first and second transmission paths can both link from the first edge node to the second edge node. It should be noted that the at least two transmission paths can also be implemented as transmission paths passing different service clusters.

In some implementations, the at least two optimal paths can include a first path from the first edge node to the second edge node and a second path from the second edge node to the first edge node. Service nodes of the first path can be different from service nodes of the second path. In other words, the first path and the second path are asymmetric between the first edge node and the second edge node.

In some implementations, the system can include multiple communications channels in the SDN to support multichannel communications. For example, each communications channel can include a set of service nodes in the SDN. At least one service node of the set can be associated with a different communications channel.

Figure 8:
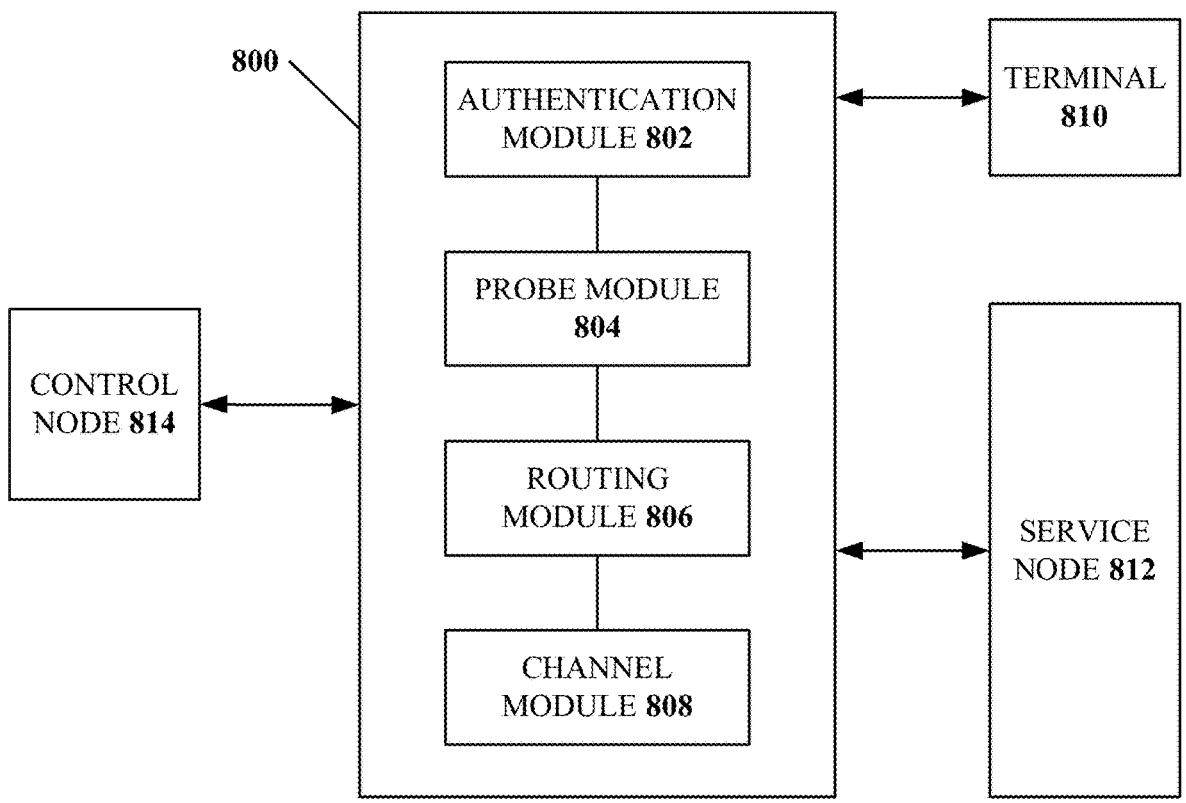
FIG. 8 is a diagram of an example apparatus for real-time video communications according to implementations of this disclosure.

FIG. 8 is a diagram of an example apparatus for real-time video communications according to implementations of this disclosure. For example, the apparatus can be a service node of an SDN, and the SDN can be the SDN 200 in FIG. 2. The service node can be any of the service nodes 204-218.

The service node 800 can include multiple software modules designated to perform multiple functions as described in FIGS. 2-7. The software modules include at least an authentication module 802, a probe module 804, a routing module 806, and a channel module 808. The service node 800 can be connected to at least one of a terminal 810, a service node 812, and a control node 814 in the SDN, in which the connections are bidirectional.

The authentication module 802 can be used to authenticate the terminal 810 when the service node 800 is selected as the edge node of the terminal 810. The probe module 804 can be used to determine a path metric, such as a load status of the service node 800 and a transmission metric between the service node 800 and other directly-connected service nodes in the SDN. For example, the other directly-connected service nodes can include the service node 812. The probe module 804 can be used to determine the transmission metric using at least one of the active mode and the passive mode as detailed in the description related to in FIG. 2. The path metric determined by the probe module 804 can be transmitted to the control node 814. The control node 814 can determine optimal paths including the service node 800 based on the path metric. The control node 814 can send path data back to the service node 800, which can include the optimal paths.

The routing module 806 can be used to send and receive user data (e.g., multimedia data) in accordance with the optimal paths. The optimal paths can be obtained from path data transmitted from the control node 814 when the service node 800 is functioning as an edge node, or from another service node (e.g., the service node 812) when the service node 800 is functioning as a router node. The path data (e.g., a routing table) can be extracted from headers of user data packets received by the routing module 806. The optimal paths can be determined as entries of a routing table. The entries can include multiple IP addresses. For example, the optimal path can be a series of ordered IP addresses including the IP address of the service node 800. By identifying a next IP address along with the optimal path, the routing module 806 can determine a target service node for forwarding the user data.

The channel module 808 can be used to support multichannel communications of the service node 800. The service node 800 can be simultaneously used in different channels for data transmission, wherein user data in the different channels can be received and/or forwarded by the service node 800 independently. For example, the channel module 808 can keep a record of channel IDs. The channel IDs can be related to the optimal path and the user data packets. In some implementations, a unique channel ID can be included in headers of the user data packets, and the optimal path can also include a field to store a channel ID. When the routing module 806 receives a user data packet, the channel module 808 can determine the unique channel ID from packet headers of the user data and compare with the channel IDs in the path data. When a match is found, the user data with the unique channel ID can be forwarded to a next service node of an optimal path having the same unique channel ID.

An apparatus of a software-defined network (SDN) for real-time multimedia communications is also disclosed herein. For example, the apparatus can be a control node (e.g., the control node 202) of the SDN. The apparatus can include a processor (e.g., the processor 116) and a memory (e.g., the memory 118) coupled to the processor. The memory can be configured to store instructions which, when executed by the processor, can become operational with the processor to perform operations O1 and O2 as follows.

At the operation O1, a path metric associated with a first service node in the SDN and a second service node in the SDN is received by the processor in a repetitive manner. The path metric includes load statuses of the first service node and the second service node and a transmission metric (e.g., a bidirectional transmission metric) between the first service node and the second service node.

At the operation O2, in response to receiving the path metric, a cascade network topology is updated. The cascade network topology includes an optimal path for transmitting multimedia data between a first terminal connected to the first service node and a second terminal connected to the second service node.

In some implementations, based on a predetermined rule, a communications channel of the SDN can be allowed or blocked by the apparatus. For example, the predetermined rule can include determining whether user data in the communications channel includes illegal, rule-violating, or inappropriate contents specified by an administrator of the SDN.

In some implementations, based on a determination that a number of terminals in a communications channel exceeds a threshold number, a transmission mode can be determined for the communications channel to transmit the multimedia data. For example, the transmission mode comprises at least one of a multicast mode, a broadcast mode, and a unicast mode.

Figure 9:
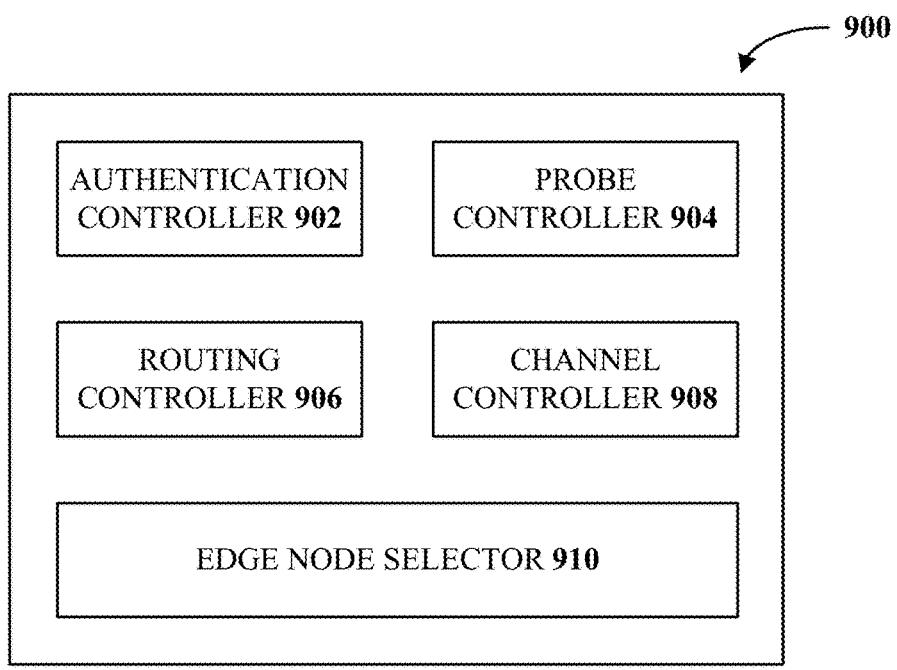
FIG. 9 is a diagram of another example apparatus for real-time video communications according to implementations of this disclosure.

FIG. 9 is a diagram of another example apparatus for real-time video communications according to implementations of this disclosure. For example, the apparatus can be a control node 900 of an SDN, and the SDN can be the SDN 200 in FIG. 2. The control node 900 can be the control node 814 in FIG. 8, or the control node 202 in FIG. 2.

The control node 900 can include multiple software modules designated to perform multiple functions as described in FIGS. 2-7. The software modules include at least an authentication controller 902, a probe controller 904, a routing controller 906, a channel controller 908, and an edge node selector 910. The control node 900 can be connected to multiple service nodes in the SDN, such as the service nodes 800 and 812 in FIG. 8.

The authentication controller 902 can be used to perform content control of communications channels and access control of connected terminals. For example, the authentication controller 902 can monitor contents of the transmitted data by analyzing sample data. The sample data can be generated by the service nodes and transmitted to the control node 900. When the authentication controller 902 determines that the contents of a channel violate a rule preset by an administrator of the SDN, the data communications of the channel can be blocked. For another example, the authentication controller 902 can monitor behaviors of the connected terminals. When the authentication controller 902 determines that a behavior of a connected terminal is malicious (e.g., disseminating copyrighted contents without authorization), the authentication controller 902 can terminate the connection of that terminal to the SDN.

The probe controller 904 can be used to determine the optimal paths. For example, the path metrics can be received from service nodes (e.g., from the probe module 804 of the service node 800) by the probe controller 904. The probe controller 904 can determine the optimal paths based on the path metrics and/or prior optimal paths. For different path metrics received from different service nodes, different optimal paths can be generated. In some implementations, for two edge nodes of the SDN, multiple optimal paths (e.g., K optimal paths) can be determined by the probe controller 904. For example, the multiple optimal paths can be ordered in accordance with latency, and each of them can serve as an alternative optimal path to others.

The routing controller 906 can be used to determine cascade network topologies and propagate the same to the service nodes. In some implementations, based on the optimal paths associated with an edge node connected to data-sending terminals determined by the probe controller 904, the routing controller 906 can determine a cascade network topology by synthesizing the optimal paths with the edge node set as a sender (e.g., the sender 302 in FIG. 3). In some implementations, the routing controller 906 can send path data including the determined cascade network topologies to routing modules (e.g., the routing module 806) of related service nodes (e.g., the service node 800).

The channel controller 908 can be used to support multichannel communications of the SDN. For example, the channel controller 908 can assign, maintain, and destroy channel IDs to the communication channels of the SDN. When a new channel is established for a multimedia communications event, the channel can be registered at the control node, and a channel ID can be assigned to that channel by the channel controller 908. In some implementations, the channel controller 908 can work with channel modules of service nodes to synchronize information of senders (e.g., the sender 302 in FIG. 3) and receivers (e.g., the receivers 310-326) of different channels. In some implementations, the channel controller 908 can be used to dynamically select the transmission modes (e.g., unicast, broadcast, and multicast) for data transmission in different channels.

The edge node selector 910 can be used to select edge nodes for terminals. For example, the edge node selector 910 can receive statistics about parameters (e.g., a data transmission quota, a load status, and a health status) from candidate service nodes of a terminal. The edge node selector 910 can then determine the edge node based on various consideration factors. In some implementations, the edge node selector 910 can dynamically change the edge node for the same terminal during data transmission based on changed parameters of the candidate service nodes.

Figure 10:
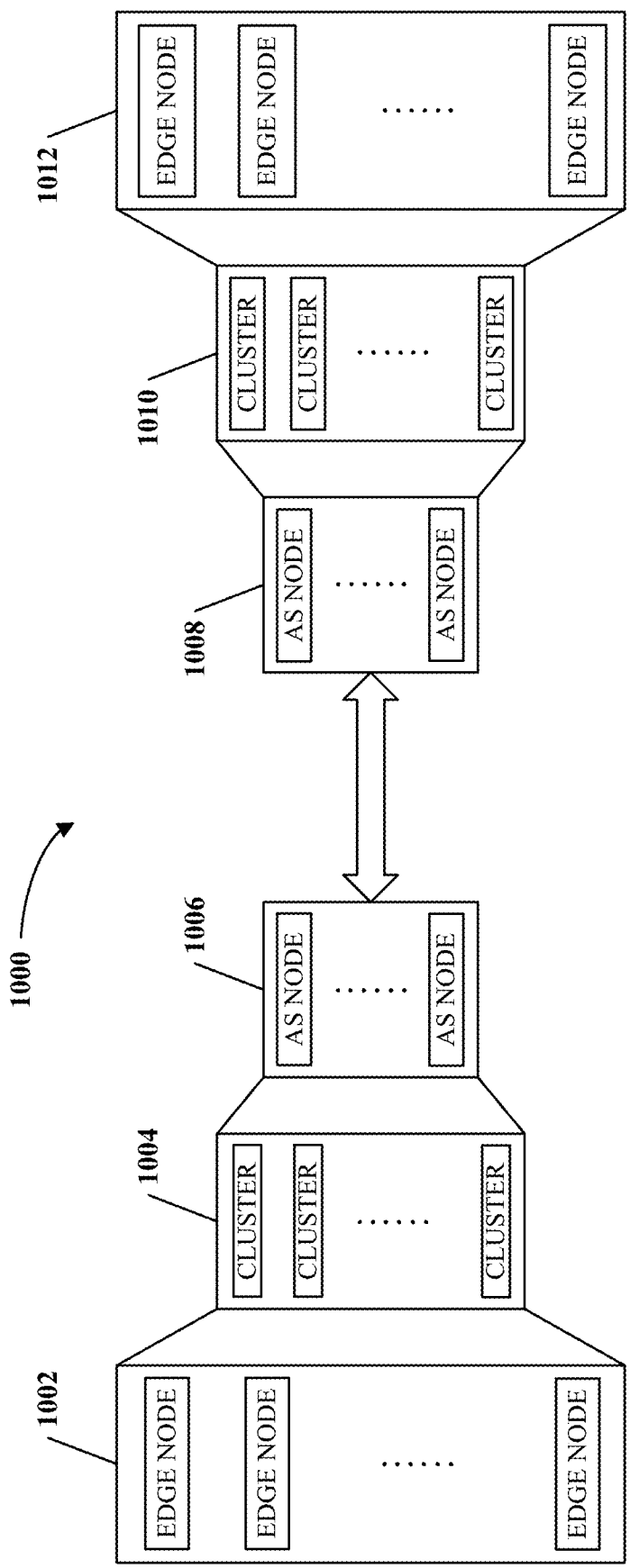
FIG. 10 is a diagram of an example communications channel for real-time video communications according to implementations of this disclosure.

FIG. 10 is a diagram of an example communications channel 1000 for real-time video communications according to implementations of this disclosure. Bidirectional communications can be established between any two connected terminals of the channel 1000. The channel 1000 can be seen as a set of service nodes that serve the same channel. The service nodes of the channel 1000 can be divided into different layers. The layers can be divided based on at least one of geographic locations of the service nodes, ISP's the service nodes connecting to, topologies of a local network of the service nodes, and autonomous systems (AS's) the service nodes belonging to.

In some implementations, the service nodes in the channel 1000 can be divided into layers of edge node sets 1002 and 1012, service cluster sets 1004 and 1010, and AS's 1006 and 1008. A first terminal connected to a first edge node in the edge node set 1002 can establish a bidirectional transmission path with a second terminal connected to a second edge node in the edge node set 1012. The bidirectional transmission path can pass through the edge node set 1002, the service cluster set 1004, the AS 1006, the AS 1008, the service cluster set 1010, and the edge node set 1012. For ease of explanation without causing ambiguity, as an example, multimedia data is assumed to be transmitted from the first terminal to the second terminal hereinafter.

The edge node set 1002 include multiple edge nodes. Each edge node can be responsible for connecting to terminals within a geographic region, such as a city. Multiple edge nodes can be provided to cover a geographic region (e.g., a metropolitan area including multiple cities).

The service cluster set 1004 include multiple service clusters. Each service cluster can represent a group of service nodes that have similar hardware configurations and are under the same physical network. For example, a service cluster can include service nodes in the same server room, in the same building, sharing the same gateway, or interconnected by the same ISP. Each service cluster can connect to multiple edge nodes. The service cluster can aggregate or duplicate user data received from its connected edge nodes.

The AS 1006 include multiple AS nodes. The AS nodes in the same AS can share the same physical network characteristics, and the transmission quality between the AS nodes can be highly reliable. For example, the AS node can be a major node for international network connections. Each AS node can connect to multiple service clusters. The AS node can further aggregate user data received from its connected service clusters.

For each layer of the channel 1000, one or more nodes of that layer can be selected as router nodes for forwarding user data within nodes of that layer. The selection of the router nodes can be based on, for example, system loads and transmission qualities.

For example, the channel 1000 can be used for an international conference event, in which a first terminal is sending multimedia data to a second terminal in another country. The first terminal in a city C1 can be connected to the first edge node in the edge node set 1002. The user data received by the first edge node can be forwarded and/or transmitted to a first service cluster in the service cluster set 1004. The first service cluster can receive data from edge nodes connected by a first ISP P. The user data received by the first service cluster can be forwarded and/or transmitted to a first AS node in the AS 1006. The first AS node can receive data from service clusters within a country CR1.

The user data sent by the first terminal can be transmitted by the first AS node to a second AS node of the AS 1008 (e.g., across countries). The second AS node can receive user data targeting terminals in a country CR2. The user data sent by the first terminal can be forwarded and/or transmitted to a second service cluster in the service cluster set 1010. The second service cluster can receive user data targeting terminals in a state or province S of the country CR2. The user data sent by the first terminal can be further forwarded and/or transmitted to the second edge node in the edge node set 1012. The second edge node can serve a city C2 in the state or province S, and the second terminal is in the city C2. The second terminal can receive the user data sent by the first terminal from the second edge node, and the data transmission is completed.

As can be seen from the above description, by dividing the channel 1000 into layers sharing similar characteristics and aggregating the user data in each layer, potential network bandwidth can be maximally utilized and transmission latency between terminals can be greatly reduced.

As described above, a person skilled in the art will note that all or a portion of the aspects of the disclosure described herein can be implemented using a general-purpose computer/processor with a computer program that, when executed, carries out any of the respective techniques, algorithms, and/or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), field-programmable gate arrays (FPGAs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

The terms "signal" and "data" are used interchangeably herein. Further, portions of the computing devices do not necessarily have to be implemented in the same manner. Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. An apparatus for real-time multimedia communications using a software-defined network (SDN) including a control node and a pool of service nodes comprising at least one service node, the apparatus comprising:
a processor; and
a memory coupled to the processor, the memory configured to store instructions which when executed by the processor become operational with the processor causing the control node to:
receive, from a network operator, a rule associated with the SDN;
receive, in a first periodic manner, a path metric associated with a first service node in the SDN and a second service node in the SDN, wherein the path metric comprises at least one of:
a load status of at least one of the first service node or the second service node, or
a transmission metric between the first service node and the second service node;
in response to receiving the path metric, identify an optimal path through the pool of service nodes, wherein the optimal path complies with the rule and the pool of service nodes includes at least the first service node and the second service node;
use the optimal path to select a first edge node and a second edge node from the pool of service nodes, wherein the first edge node is a first node in the optimal path and the second edge node is a last node in the optimal path; and
update, in a second periodic manner independent of the first periodic manner, a cascade network topology comprising the optimal path for transmitting multimedia data between the first edge node and the second edge node.

2. The apparatus of claim 1, wherein:
the rule blocks a communications channel of the SDN; and
the communications channel comprises at least one of the first edge node or the second edge node.

3. The apparatus of claim 1, wherein the memory further comprises instructions which when executed by the processor become operational with the processor to:
based on a determination that a number of terminals in a communications channel exceeds a threshold number, determine a transmission mode for the communications channel to transmit the multimedia data, wherein the transmission mode comprises at least one of a multicast mode, a broadcast mode, or a unicast mode.

4. The apparatus of claim 1, wherein the path metric comprises a load status of at least one of directly-connected service nodes, or a transmission metric between at least two of the directly-connected service nodes.

5. The apparatus of claim 1, wherein the load status comprises at least one of an available throughput or a health status.

6. The apparatus of claim 1, wherein the transmission metric comprises at least one of a latency, a packet loss ratio, a network traffic load, or a transmission quota.

7. The apparatus of claim 1, wherein the optimal path is asymmetric and to be stored by the first edge node.

8. The apparatus of claim 1, where in the transmission metric is an external transmission metric or an internal transmission metric.

9. A method for real-time multimedia communications using a software-defined network (SDN) including a control node and a pool of service nodes comprising at least one service node, the method comprising:
receiving, by the control node from a network operator, a rule associated with the SDN;
receiving, by the control node in a first periodic manner, a path metric associated with a first service node in the SDN and a second service node in the SDN, wherein the path metric comprises at least one of:
a load status of at least one of the first service node or the second service node, or
a transmission metric between the first service node and the second service node;
in response to receiving the path metric, identifying, by the control node, an optimal path through a pool of service nodes, wherein the optimal path complies with the rule and the pool of service nodes includes at least the first service node and the second service node;
using, by the control node, the optimal path to select a first edge node and a second edge node from the pool of service nodes, wherein the first edge node is a first node in the optimal path and the second edge node is a last node in the optimal path; and
updating, by the control node in a second periodic manner independent of the first periodic manner, a cascade network topology comprising the optimal path for transmitting multimedia data between the first edge node and the second edge node.

10. The method of claim 9, wherein:
the rule blocks a communications channel of the SDN; and
the communications channel comprises at least one of the first edge node or the second edge node.

11. The method of claim 9, further comprising:
based on a determination that a number of terminals in a communications channel exceeds a threshold number, determining a transmission mode for the communications channel to transmit the multimedia data, wherein the transmission mode comprises at least one of a multicast mode, a broadcast mode, or a unicast mode.

12. The method of claim 9, wherein the path metric comprises a load status of at least one of directly-connected service nodes, or a transmission metric between at least two of the directly-connected service nodes.

13. The method of claim 9, wherein the load status comprises at least one of an available throughput or a health status.

14. The method of claim 9, wherein the transmission metric comprises at least one of a latency, a packet loss ratio, a network traffic load, or a transmission quota.

15. The method of claim 9, wherein the optimal path is asymmetric and to be stored by the first edge node.

16. The method of claim 9, wherein a period of the second periodic manner is different from a period of the first periodic manner.

17. A non-transitory computer-readable storage medium comprising executable instructions that, when executed by a processor of a control node, facilitate performance of operations of a software defined network (SDN) including the control node and a pool of service nodes comprising at least one service node, the operations comprising:
receiving, from a network operator, a rule associated with the SDN;
receiving, in a first periodic manner, a path metric associated with a first service node in the SDN and a second service node in the SDN, wherein the path metric comprises at least one of:
a load status of at least one of the first service node or the second service node, or
a transmission metric between the first service node and the second service node;
in response to receiving the path metric, identifying an optimal path through a pool of service nodes, wherein the optimal path complies with the rule and the pool of service nodes includes at least the first service node and the second service node;
using the optimal path to select a first edge node and a second edge node from the pool of service nodes, wherein the first edge node is a first node in the optimal path and the second edge node is a last node in the optimal path; and
updating, in a second periodic manner independent of the first periodic manner, a cascade network topology comprising the optimal path for transmitting multimedia data between the first edge node and the second edge node.

18. The non-transitory computer-readable storage medium of claim 17, wherein:
the rule blocks a communications channel of the SDN; and
the communications channel comprises at least one of the first edge node or the second edge node.

19. The non-transitory computer-readable storage medium of claim 17, wherein the operations comprising:
determining, based on a determination that a number of terminals in a communications channel exceeds a threshold number, determine a transmission mode for the communications channel to transmit the multimedia data, wherein the transmission mode comprises at least one of a multicast mode, a broadcast mode, or a unicast mode.

20. The non-transitory computer-readable storage medium of claim 17, wherein:
- the path metric comprises a load status of at least one of directly-connected service nodes or a transmission metric between at least two of the directly-connected service nodes;
- the load status comprises at least one of an available throughput or a health status; and
- the transmission metric comprises at least one of a latency, a packet loss ratio, a network traffic load, or a transmission quota.

* * * * *